(12) United States Patent
Aoki et al.

(10) Patent No.: US 7,245,454 B2
(45) Date of Patent: Jul. 17, 2007

(54) MAGNETIC HEAD FOR VERTICAL MAGNETIC RECORDING INCLUDING MAIN POLE LAYER HAVING VARYING WIDTH AND THICKNESS, HEAD GIMBAL ASSEMBLY, AND HARD DISK DRIVE

(75) Inventors: Susumu Aoki, Tokyo (JP); Yasuyuki Notsuke, Tokyo (JP); Yuichi Watabe, Tokyo (JP); Norikazu Ota, Tokyo (JP); Tetsuya Roppongi, Tokyo (JP)

(73) Assignee: TDK Corporation, Tokyo (JP)

( * ) Notice: Subject to any disclaimer, the term of this patent is extended or adjusted under 35 U.S.C. 154(b) by 409 days.

(21) Appl. No.: 10/832,274

(22) Filed: Apr. 27, 2004

(65) Prior Publication Data
US 2004/0228033 A1 Nov. 18, 2004

(30) Foreign Application Priority Data
May 15, 2003 (JP) .............................. 2003-136697

(51) Int. Cl.
*G11B 5/31* (2006.01)
*G11B 5/23* (2006.01)

(52) U.S. Cl. ...................... 360/126; 360/119
(58) Field of Classification Search ................ 360/125, 360/126, 119, 317
See application file for complete search history.

(56) References Cited

U.S. PATENT DOCUMENTS

| 4,727,643 A | * | 3/1988 | Schewe et al. ............. 360/119 |
| 4,782,416 A | * | 11/1988 | Hillenbrand et al. ........ 360/125 |
| 4,791,719 A | | 12/1988 | Kobayashi et al. |
| 4,807,076 A | * | 2/1989 | Nakashima et al. ........ 360/126 |
| 4,987,510 A | * | 1/1991 | Schewe et al. ............. 360/126 |
| 5,255,142 A | * | 10/1993 | Williams et al. ............ 360/126 |
| 6,791,793 B1 | * | 9/2004 | Chen et al. ................. 360/126 |
| 6,952,325 B2 | * | 10/2005 | Sato et al. .................. 360/125 |
| 7,002,775 B2 | * | 2/2006 | Hsu et al. ................... 360/125 |
| 2002/0034043 A1 | | 3/2002 | Okada et al. ............... 360/125 |
| 2002/0080524 A1 | | 6/2002 | Takahashi et al. .......... 360/126 |
| 2003/0193744 A1 | | 10/2003 | Takahashi et al. .......... 360/126 |
| 2005/0219747 A1 | * | 10/2005 | Hsu et al. ................... 360/126 |

FOREIGN PATENT DOCUMENTS

| JP | A-56-19513 | 2/1981 |
| JP | A-60-133516 | 7/1985 |
| JP | A-03-147507 | 6/1991 |
| JP | A-2001-209909 | 8/2001 |
| JP | A 2002-92821 | 3/2002 |
| JP | A 2002-133610 | 5/2002 |
| JP | A 2002-197615 | 7/2002 |

* cited by examiner

*Primary Examiner*—Craig A. Renner
(74) *Attorney, Agent, or Firm*—Oliff & Berridge, PLC

(57) ABSTRACT

A write head of a magnetic head for vertical magnetic recording comprises: a coil; a main pole layer that allows the magnetic flux corresponding to the magnetic field generated by the coil to pass therethrough and generates a write magnetic field; an auxiliary pole layer; a gap layer provided between the main pole layer and the auxiliary pole layer; and a yoke layer for magnetically coupling the main pole layer to the auxiliary pole layer. The main pole layer has a flat top surface. In the main pole layer the position in which the thickness starts to increase is located between the medium facing surface and the position in which the width starts to increase.

9 Claims, 13 Drawing Sheets

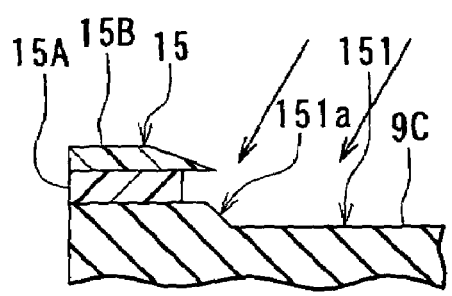 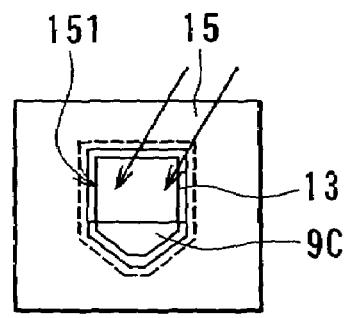
FIG. 6A  FIG. 6B
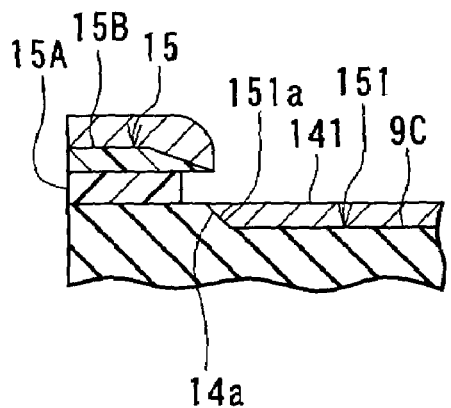 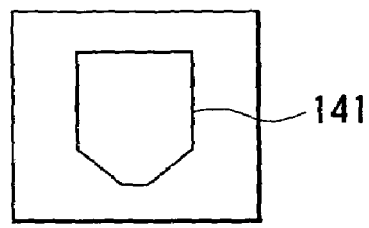
FIG. 7A  FIG. 7B
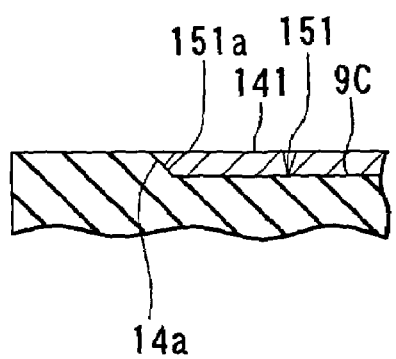 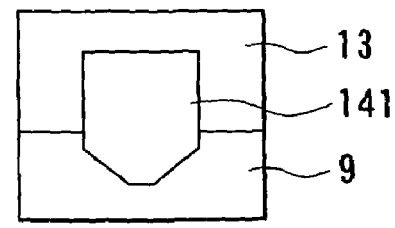
FIG. 8A  FIG. 8B

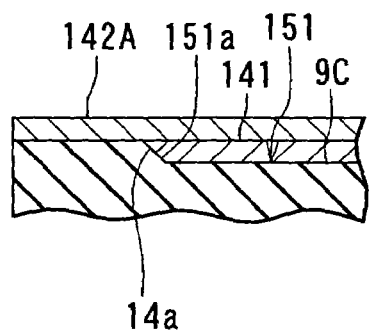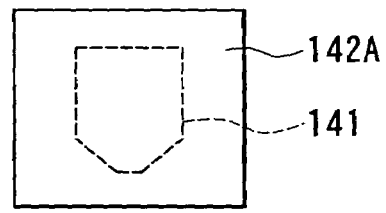
FIG. 9A   FIG. 9B
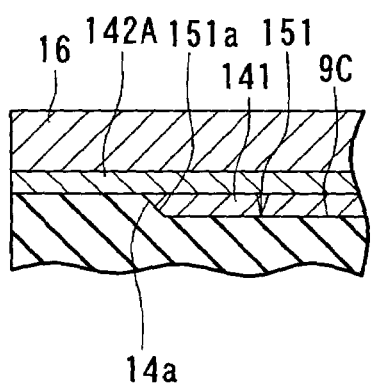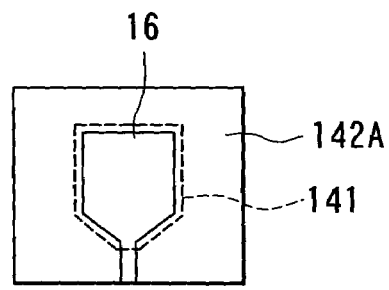
FIG. 10A   FIG. 10B
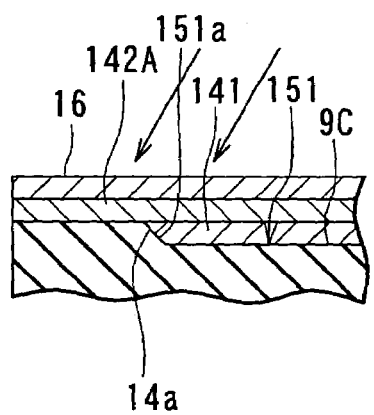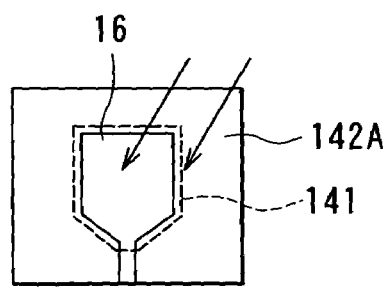
FIG. 11A   FIG. 11B

MAGNETIC HEAD FOR VERTICAL MAGNETIC RECORDING INCLUDING MAIN POLE LAYER HAVING VARYING WIDTH AND THICKNESS, HEAD GIMBAL ASSEMBLY, AND HARD DISK DRIVE

BACKGROUND OF THE INVENTION

1. Field of the Invention

The present invention relates to a magnetic head for vertical magnetic recording that is used for writing data on a recording medium by using a vertical magnetic recording system, a method of manufacturing such a magnetic head, and to a head gimbal assembly and a hard disk drive each including the magnetic head for vertical magnetic recording.

2. Description of the Related Art

The recording systems of magnetic read/write device include a longitudinal magnetic recording system wherein signals are magnetized in the direction along the surface of the recording medium (the longitudinal direction) and a vertical (or perpendicular) magnetic recording system wherein signals are magnetized in the direction orthogonal to the surface of the recording medium. It is known that the vertical magnetic recording system is harder to be affected by thermal fluctuation of the recording medium and capable of implementing higher linear recording density, compared to the longitudinal magnetic recording system.

The magnetic heads used for the vertical magnetic recording system include ring heads having a structure similar to the magnetic heads used for the longitudinal magnetic recording system and single-pole heads that apply a magnetic field in the vertical direction to the recording medium by a single main magnetic pole. Where the single-pole head is used, the recording medium typically used is a two-layer vertical recording medium wherein a soft magnetic layer and a magnetic recording layer are stacked on a substrate. A recording system that uses the single-pole head and the two-layer vertical recording medium in combination allows the main pole to generate an intense magnetic field in the vertical direction that exhibits steep changes in the direction in which the recording medium moves. It is therefore expected that this system achieves a high recording sensitivity.

A magnetic head used for a magnetic disk drive such as a hard disk drive is typically provided in a slider. The slider has a medium facing surface that faces toward a recording medium. This medium facing surface has an air-inflow-side end and an air-outflow-side end. The slider slightly flies over the surface of the recording medium by means of the airflow that comes from the air-inflow-side end into the space between the medium facing surface and the recording medium. The magnetic head is typically disposed near the air-outflow-side end of the medium facing surface of the slider.

In the magnetic disk drive that aligns the magnetic head through the use of a rotary actuator, the magnetic head moves on the recording medium along a circular orbit centered on the center of rotation of the rotary actuator. In this case, a tilt called a skew of the magnetic head is generated with respect to the tangent of the circular track, in accordance with the position of the magnetic head across the tracks. The angle of this tilt is called a skew angle. If such a skew angle is generated in the magnetic disk drive, writing on an adjacent track may result.

According to the single-pole head, as disclosed in the Published Unexamined Japanese Patent Application 2002-92821, to prevent writing on an adjacent track when a skew angle is generated, it is often performed that the surface of the main pole exposed from the medium facing surface is made trapezoid-shaped wherein the side located backward in the direction of movement of the recording medium (that is, the side located on the air-inflow-side end of the slider) is smaller than the other side. However, this case has a problem that, if the track width, that is, the width of the main pole taken in the medium facing surface, is reduced to improve the recording density, the main pole is likely to be removed from the underlying layer in the course of the manufacturing process of the magnetic head.

To prevent writing on an adjacent track when a skew angle is generated without causing the above-mentioned problem, it is possible to reduce the thickness of the main pole as the track width is reduced. However, this case has a problem that the area of the surface of the main pole exposed from the medium facing surface is reduced, so that the write field intensity is decreased.

A technique for preventing a decrease in write field intensity disclosed in the Published Unexamined Japanese Patent Application 2002-133610 is that the thickness of the main pole near the medium facing surface is decreased as the distance from the medium facing surface decreases.

Another technique for preventing a decrease in write field intensity disclosed in the Published Unexamined Japanese Patent Application 2002-197615 is that, in a magnetic head incorporating a main pole layer and a yoke layer thicker than the main pole layer, the front-end face of the yoke layer is made to be a sloped surface or a curved surface wherein the distance from the medium facing surface increases as the distance from the main pole layer increases.

According to the magnetic head disclosed in the Published Unexamined Japanese Patent Application 2002-133610, in the neighborhood of the medium facing surface, the surface of the main pole on a side of the air-inflow-side end or the air-outflow-side end is tapered. Consequently, in this magnetic head, in the course of manufacturing process thereof, if the point at which polishing is stopped is shifted when the medium facing surface is formed by polishing, the thickness of the main pole taken in the medium facing surface is varied. This magnetic head therefore has a problem that it is difficult to mass-produce uniform magnetic heads.

According to the magnetic head disclosed in the Published Unexamined Japanese Patent Application 2002-197615, the front-end face of the yoke layer thicker than the main pole layer is disposed near the medium facing surface. As a result, this magnetic head has a problem that writing on an adjacent track is likely to occur, due to the magnetic field generated from the front-end face of the yoke layer, when a skew angle is generated. The magnetic head has another problem that changes in vertical components of the write magnetic field with respect to the direction of movement of the recording medium are made moderate and it is thereby difficult to improve the recording density. Furthermore, according to the magnetic head, the top surface of the yoke layer is flattened and the main pole layer is formed thereon. Consequently, in the magnetic head, in the course of the manufacturing process thereof, if the point at which polishing is stopped is shifted when the top surface of the yoke layer is flattened by polishing, the position of the end of the yoke layer closer to the medium facing surface is varied. This magnetic head therefore has a problem that it is difficult to mass-produce uniform magnetic heads.

According to the magnetic head disclosed in the Published Unexamined Japanese Patent Application 2002-197615, the main pole layer is formed on the yoke layer. In the manufacturing process of this magnetic head the yoke layer and the main pole layer are individually patterned. As a result, misalignment of the yoke layer and the main pole layer of this magnetic head is likely to occur. In the magnetic head, in particular, each of the yoke layer and the main pole layer has a portion near the medium facing surface, the portion having a width smaller than the other portion. Therefore, misalignment of these portions having small widths could cause a reduction in writing characteristics of the magnetic head. In particular, if the track width is reduced down to 0.20 µm or smaller, or 0.15 µm or smaller, a reduction in writing characteristics due to such misalignment is negligible.

OBJECT AND SUMMARY OF THE INVENTION

It is an object of the invention to provide a magnetic head for vertical magnetic recording that is capable of preventing writing on an adjacent track and suppressing a reduction in write magnetic field intensity and that is suitable for mass-production, a method of manufacturing such a magnetic head, and a head gimbal assembly and a hard disk drive each including the magnetic head for vertical magnetic recording.

A magnetic head for vertical magnetic recording of the invention comprises: a medium facing surface that faces toward the recording medium; a coil for generating a magnetic field corresponding to data to be written on the recording medium; a main pole layer for allowing a magnetic flux corresponding to the field generated by the coil to pass therethrough and generating a write magnetic field for writing the data on the recording medium through the use of a vertical magnetic recording system; an auxiliary pole layer disposed with a specific space from the main pole layer along a direction of movement of the recording medium; a gap layer made of a nonmagnetic material and provided between the main pole layer and the auxiliary pole layer; and a yoke layer magnetically coupling the main pole layer to the auxiliary pole layer and having an end that is closer to the medium facing surface and located at a distance from the medium facing surface.

According to the magnetic head of the invention, the main pole layer incorporates: a first portion disposed in a region closer to the medium facing surface than a first position located at a specific distance from the medium facing surface, the first portion having a uniform width, regardless of a distance from the medium facing surface; and a second portion disposed in a region farther from the medium facing surface than the first position and having a width greater than the width of the first portion. The first portion has a first surface closer to the gap layer and a second surface farther from the gap layer, the second surface being substantially flat. The first portion includes a region closer to the medium facing surface than a second position located between the first position and the medium facing surface, the region closer to the medium facing surface having a specific thickness, and includes a region farther from the medium facing surface than the second position, the region farther from the medium facing surface having a thickness greater than the specific thickness. The second surface that is 'substantially flat' means that, even if the second surface is formed to be flat, asperities of about 0.05 µm may be generated in connection with the accuracy level of the manufacturing process, so that the second surface having such a degree of asperities is included.

According to the magnetic head of the invention, the second position in which the thickness of the main pole layer changes is located between the medium facing surface and the first position in which the width of the main pole layer changes. As a result, according to the invention, writing on an adjacent track is prevented and a reduction in write field strength is suppressed. According to the magnetic head of the invention, in the region between the medium facing surface and the second position, the first portion of the main pole layer has a uniform width and a uniform thickness, regardless of the distance from the medium facing surface. As a result, according to the invention, in the course of the manufacturing process of the magnetic head, even if the point at which polishing is stopped is slightly shifted when the medium facing surface is formed by polishing, the width and the thickness of the main pole layer taken in the medium facing surface remain the same. As a result, the magnetic head for vertical magnetic recording of the invention is suitable for mass-production.

According to the magnetic head of the invention, the main pole layer incorporates a first layer touching the gap layer and a second layer stacked on the first layer. The first layer has an end that is closer to the medium facing surface and located in the second position. The second layer has an end face exposed from the medium facing surface. In this case, the second layer may have a saturated flux density greater than that of the first layer.

According to the magnetic head of the invention, the first surface of the first portion may include a sloped surface that is located in a region farther from the medium facing surface than the second position and sloped such that the distance from the second surface increases as the distance from the medium facing surface increases. In this case, the sloped surface and the second surface may form an angle that is 25 degrees or greater and smaller than 90 degrees.

According to the magnetic head of the invention, the main pole layer may have a thickness taken in the medium facing surface that falls within a range of 0.05 µm to 0.3 µm inclusive.

According to the magnetic head of the invention, the main pole layer has a surface exposed from the medium facing surface and this surface may have a shape of trapezoid wherein the side closer to the gap layer is smaller than the other side.

According to the magnetic head of the invention, the yoke layer may be in contact with a surface of the second portion of the main pole layer, the surface facing toward the gap layer.

A method of manufacturing the magnetic head for vertical magnetic recording of the invention comprises the steps of: forming the auxiliary pole layer; forming the gap layer, the coil and the yoke layer on the auxiliary pole layer; and forming the main pole layer on the gap layer.

According to the method of manufacturing the magnetic head of the invention, the step of forming the main pole layer includes the steps of forming a first layer touching the gap layer and having an end that is closer to the medium facing surface and located in the second position; and forming a second layer having an end face exposed from the medium facing surface on the first layer.

According to the method of the invention, the step of forming the main pole layer may further include, before the step of forming the first layer, the step of forming a concave portion, in which the first layer is to be disposed, in the top surface of the gap layer by etching the gap layer, and the first layer may be formed in the concave portion in the step of forming the first layer.

In the step of forming the concave portion, an end face of the concave portion closer to the medium facing surface may be made a sloped surface that is sloped such that the distance from the medium facing surface increases as the depth of the sloped surface increases.

The gap layer may be selectively etched through the use of a mask having an undercut in the step of forming the concave portion, and the first layer may be formed by sputtering through the use of the mask in the step of forming the first layer.

In the step of forming the concave portion, ion milling may be performed to form the concave portion in such a manner that the direction in which ion beams move forms an angle of 0 to 20 degrees inclusive with respect to the direction orthogonal to the top surface of the gap layer before the concave portion is formed. In the step of forming the concave portion the concave portion may be formed by reactive ion etching.

According to the method of the invention, the step of forming the second layer may include the steps of: forming a layer to be patterned for forming the second layer on the first layer; forming an etching mask for patterning the layer to be patterned on the layer to be patterned; and selectively etching the layer to be patterned and the first layer, using the etching mask. In this case, the layer to be patterned is patterned so that the second layer is formed and the first layer is patterned in the step of etching.

According to the method of the invention, the step of forming the main pole layer may further include the step of flattening the top surfaces of the gap layer and the first layer between the step of forming the first layer and the step of forming the second layer.

According to the method of the invention, the step of forming the main pole layer may further include the step of flattening the top surface of the second layer after the second layer is formed.

A head gimbal assembly of the invention comprises: a slider including the magnetic head for vertical magnetic recording of the invention and disposed to face toward a recording medium; and a suspension flexibly supporting the slider.

A hard disk drive of the invention comprises: a slider including the magnetic head for vertical magnetic recording of the invention and disposed to face toward a circular-plate-shaped recording medium that is rotated and driven; and an alignment device supporting the slider and aligning the slider with respect to the recording medium.

Other and further objects, features and advantages of the invention will appear more fully from the following description.

BRIEF DESCRIPTION OF THE DRAWINGS

FIG. 6A and FIG. 6B are views for illustrating a step that follows the step shown in FIG. 5A and FIG. 5B.

FIG. 7A and FIG. 7B are views for illustrating a step that follows the step shown in FIG. 6A and FIG. 6B.

FIG. 8A and FIG. 8B are views for illustrating a step that follows the step shown in FIG. 7A and FIG. 7B.

FIG. 9A and FIG. 9B are views for illustrating a step that follows the step shown in FIG. 8A and FIG. 8B.

FIG. 10A and FIG. 10B are views for illustrating a step that follows the step shown in FIG. 9A and FIG. 9B.

FIG. 11A and FIG. 11B are views for illustrating a step that follows the step shown in FIG. 10A and FIG. 10B.

DETAILED DESCRIPTION OF THE PREFERRED EMBODIMENT

Figure 1:
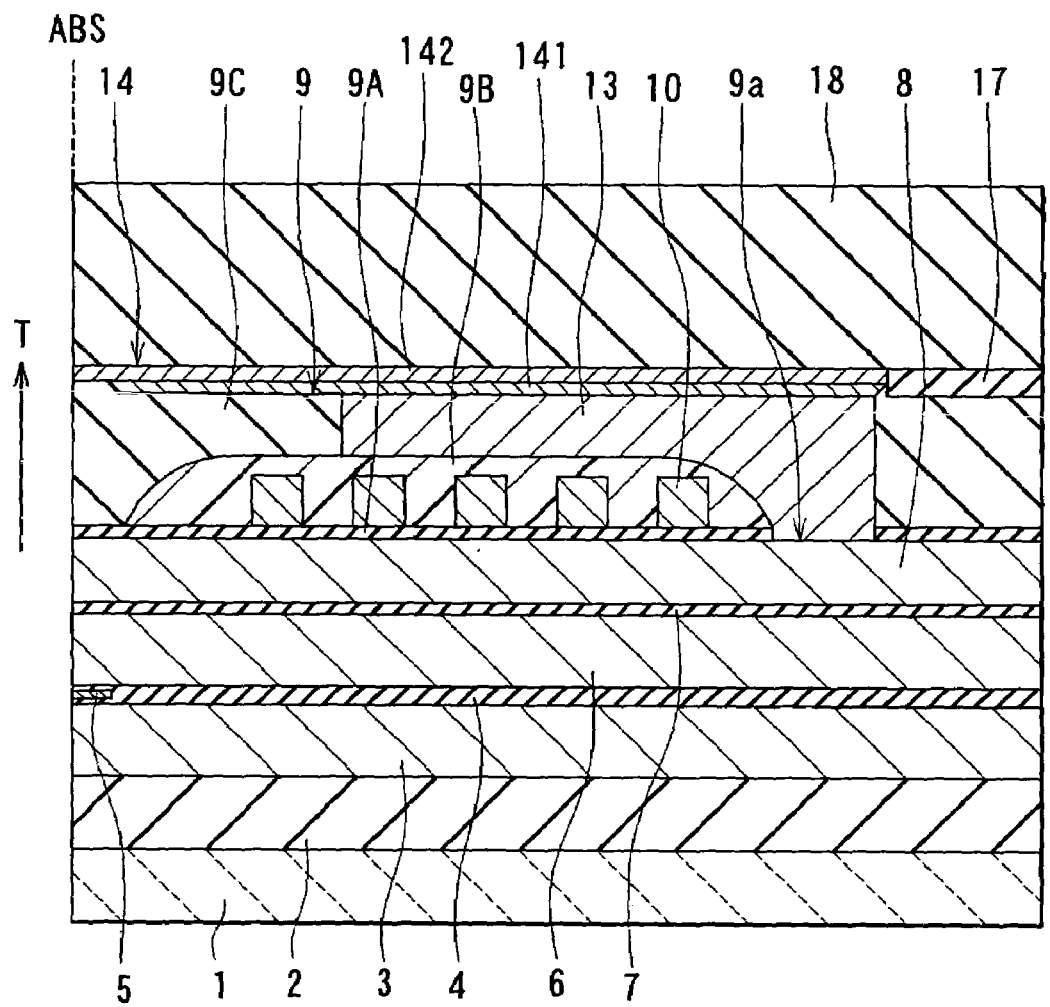
FIG. 1 is a cross-sectional view for illustrating the configuration of a magnetic head for vertical magnetic recording of an embodiment of the invention.

A preferred embodiment of the invention will now be described in detail with reference to the accompanying drawings. Reference is now made to FIG. 1 to describe the configuration of a magnetic head for vertical magnetic recording of an embodiment of the invention. FIG. 1 is a cross-sectional view for illustrating the configuration of the magnetic head of the embodiment. FIG. 1 illustrates a cross section orthogonal to the medium facing surface and a surface of a substrate. The arrow indicated with T in FIG. 1 shows the direction of movement of a recording medium.

As shown in FIG. 1, the magnetic head for vertical magnetic recording (hereinafter simply called the magnetic head) of the embodiment comprises: a substrate 1 made of a ceramic such as aluminum oxide and titanium carbide ($Al_2O_3$—TiC); an insulting layer 2 made of an insulating material such as alumina ($Al_2O_3$) and formed on the substrate 1; a bottom shield layer 3 made of a magnetic material and formed on the insulating layer 2; a magnetoresistive (MR) element 5 as a read element formed on the bottom shield layer 3, an insulating layer 4 being provided between the bottom shield layer 3 and the MR element 5; and a top shield layer 6 made of a magnetic material and formed on the MR element 5, the insulating layer 4 being provided between the MR element 5 and the top shield layer 6. Each of the bottom shield layer 3 and the top shield layer 6 may have a thickness of 1 to 2 µm, for example.

The MR element 5 has an end that is located in the medium facing surface (the air bearing surface) ABS. The MR element 5 may be an element made of a magneto-sensitive film that exhibits a magnetoresistive effect, such as an anisotropic magnetoresistive (AMR) element, a giant magnetoresistive (GMR) element, or a tunnel magnetoresistive (TMR) element.

The magnetic head further comprises: a nonmagnetic layer 7 formed on the top shield layer 6; an auxiliary pole layer 8 made of a magnetic material and formed on the nonmagnetic layer 7; an insulating layer 9A formed on a portion of the auxiliary pole layer 8 in which a thin-film coil 10 is to be formed; the thin-film coil 10 formed on the insulating layer 9A; and an insulating layer 9B that is not exposed from the medium facing surface ABS, at least the space between adjacent ones of the turns of the thin-film coil 10 being filled with the insulating layer 9B. The insulating layer 9A has a contact hole 9a located at a distance from the medium facing surface ABS. In the embodiment the insulating layer 9B is formed to cover the thin-film coil 10 entirely.

The auxiliary pole layer 8 may have a thickness of 1 to 5 μm, for example. The magnetic material that constitutes the auxiliary pole layer 8 may be an iron-nickel alloy, that is, Permalloy, or a high saturated flux density material as will be described later.

The insulating layer 9A is made of a nonconductive and nonmagnetic material such as alumina and may have a thickness of 0.1 to 1 μm, for example.

The thin-film coil 10 is made of a conductive material such as copper and has turns whose thickness is 0.3 to 2 μm, for example. The number of turns of the thin-film coil 10 and the pitch thereof may be arbitrarily chosen.

The insulating layer 9B is made of a nonconductive and nonmagnetic material that exhibits fluidity when formed. To be specific, the insulating layer 9B may be made of an organic nonconductive and nonmagnetic material such as photoresist, or a spin-on-glass (SOG) film made of coating glass.

The magnetic head further comprises an insulating layer 9C that is exposed from the medium facing surface ABS and formed on the insulating layers 9A and 9B and extends from a portion of the insulating layer 9B close to the medium facing surface ABS to the medium facing surface ABS. The insulating layer 9C is made of nonconductive and nonmagnetic material that exhibits resistance to corrosion, stiffness and insulation better than the insulating layer 9B. Such a material may be an inorganic nonconductive and nonmagnetic material such as alumina or silicon dioxide ($SiO_2$). The total thickness of the insulating layers 9A and 9C taken in the medium facing surface ABS may be 2 to 5 μm, for example. The insulating layers 9A, 9B and 9C make up a gap layer 9 provided between the auxiliary pole layer 8 and a main pole layer 14 described later.

The thin-film coil 10 has a surface close to the main pole layer 14 that is located closer to the auxiliary pole layer 8 than the location of an end of the gap layer 9 closer to the main pole layer 14 (that is, an end of the insulating layer 9C closer to the main pole layer 14) in the medium facing surface ABS.

The magnetic head further comprises a yoke layer 13 made of a magnetic material. The yoke layer 13 magnetically couples the main pole layer 14 to the auxiliary pole layer 8. The yoke layer 13 is formed on the auxiliary pole layer 8 and the insulating layer 9B and extends from the region in which the contact hole 9a is formed toward the medium facing surface ABS and reaches an end face of the insulating layer 9C farther from the medium facing surface ABS. An end of the yoke layer 13 closer to the medium facing surface ABS is located at a distance of 1.5 μm or greater, for example, from the medium facing surface ABS. The magnetic material that constitutes the yoke layer 13 may be an iron-nickel alloy, that is, Permalloy, or a high saturated flux density material as will be described later.

The magnetic head further comprises: the main pole layer 14 made of a magnetic material and formed on the gap layer 9 and the yoke layer 13; an insulating layer 17 made of a nonconductive and nonmagnetic material such as alumina and disposed around the main pole layer 14; and a protection layer 18 made of a nonconductive and nonmagnetic material such as alumina and formed to cover the main pole layer 14.

The main pole layer 14 preferably has a thickness of 0.1 to 0.8 μm, and more preferably 0.2 to 0.5 μm.

As described so far, the magnetic head of the embodiment comprises the medium facing surface ABS that faces toward a recording medium, the read head, and the write head. The read head is disposed backward in the direction T of movement of the recording medium (that is, the air-inflow-side end of the slider). The write head is disposed forward in the direction T of movement of the recording medium (that is, the air-outflow-side end of the slider).

The read head comprises the MR element 5 as the read element, and the bottom shield layer 3 and the top shield layer 6 for shielding the MR element 5. Portions of the bottom shield layer 3 and the top shield layer 6 that are located on a side of the medium facing surface ABS are opposed to each other, the MR element 5 being placed between these portions.

The write head comprises the thin-film coil 10, the main pole layer 14, the auxiliary pole layer 8, the gap layer 9 and the yoke layer 13. The thin-film coil 10 generates a magnetic field corresponding to data to be written on the recording medium. The main pole layer 14 allows the magnetic flux corresponding to the field generated by the coil 10 to pass therethrough and generates a write magnetic field for writing the data on the medium by using the vertical magnetic recording system. The auxiliary layer 8 is disposed with a specific space from the main pole layer 14 along the direction T of movement of the recording medium. The gap layer 9 is made of a nonmagnetic material and provided between the main pole layer 14 and the auxiliary pole layer 8. The yoke layer 13 magnetically couples the main pole layer 14 to the auxiliary pole layer 8, and has an end that is closer to the medium facing surface ABS and located at a distance from the medium facing surface ABS.

According to the magnetic head of the embodiment, the recording medium used may be either a two-layer medium or a single-layer medium.

Figure 2:
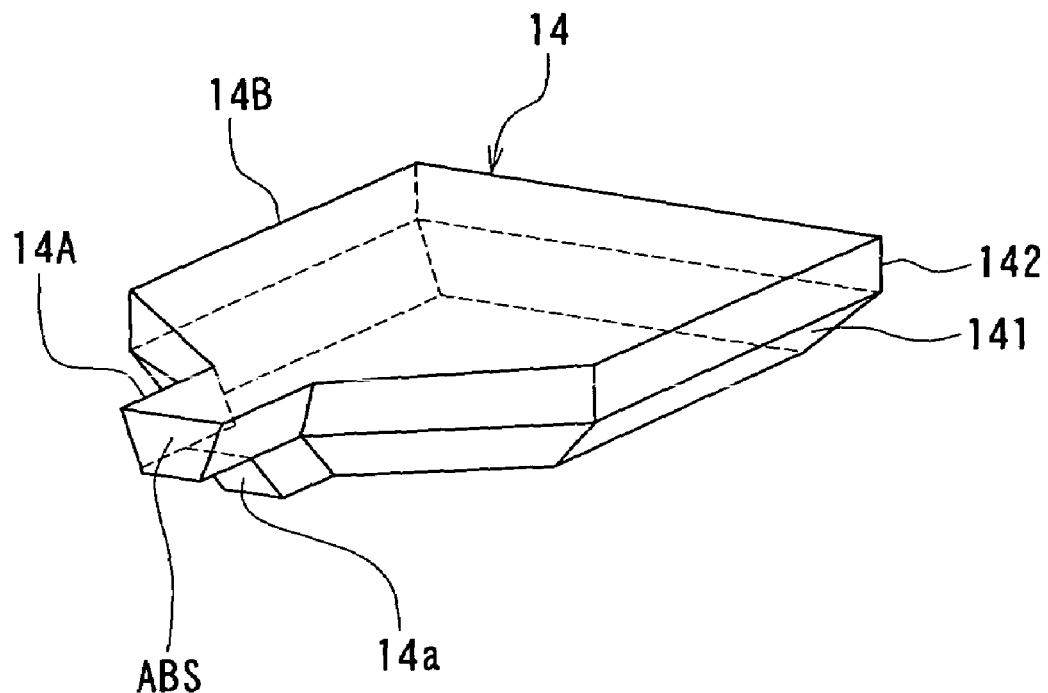
FIG. 2 is a perspective view of a main pole layer of the embodiment.
Figure 3:
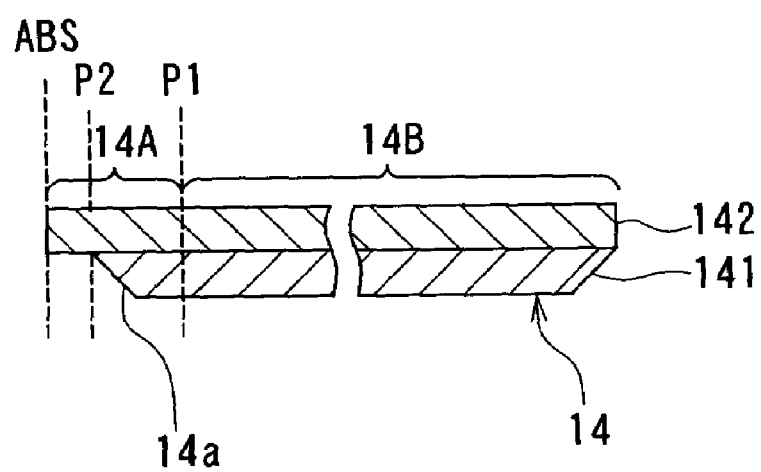
FIG. 3 is a cross-sectional view of the main pole layer of the embodiment.
Figure 4:
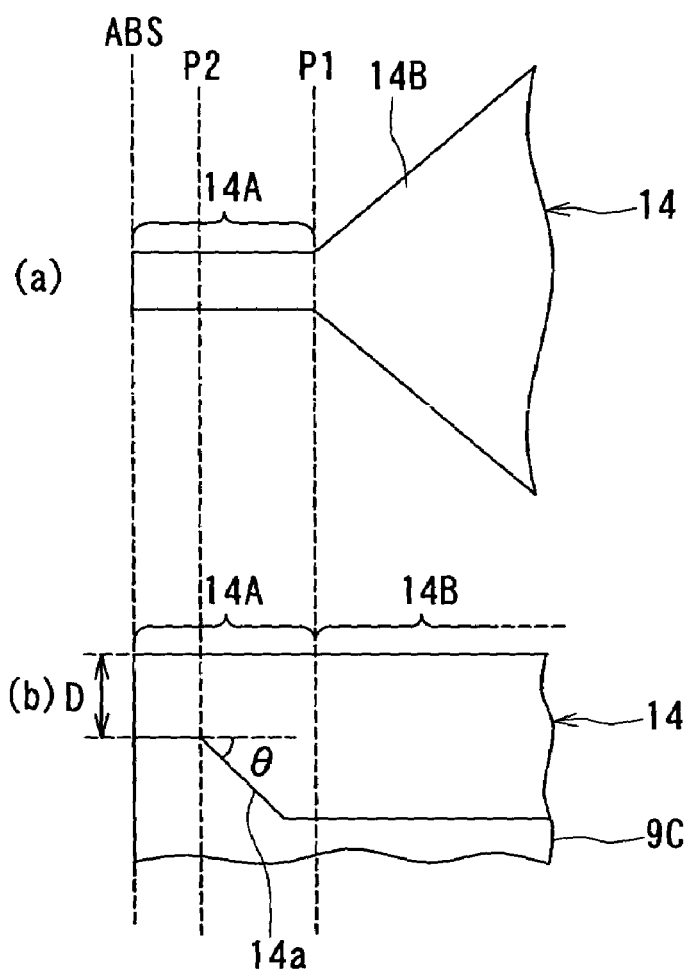
FIG. 4 is a view for illustrating the shape of the main pole layer of the embodiment.

Reference is now made to FIG. 2 to FIG. 4 to give a detailed description of the shape of the main pole layer 14. FIG. 2 is a perspective view of the main pole layer 14. FIG. 3 is a cross-sectional view of the main pole layer 14. FIG. 4 is a view for illustrating the shape of the main pole layer 14. FIG. 3 is a cross section orthogonal to the medium facing surface ABS and the surface of the substrate 1. FIG. 4(*a*) is a top view of a portion of the main pole layer 14 near the medium facing surface ABS. FIG. 4(*b*) is a cross-sectional view of the portion of the main pole layer 14 near the medium facing surface ABS.

The main pole layer 14 has a first portion 14A and a second portion 14B. The first portion 14A is disposed closer to the medium facing surface ABS than a first position P1 located at a specific distance from the medium facing surface ABS. The second portion 14B has a width greater than the width of the first portion 14A and is disposed farther from the medium facing surface ABS than the first position P1. The width of the first portion 14A is not affected by the distance from the medium facing surface ABS. The width of the second portion 14B is equal to the width of the first portion 14A in the first position P1 and gradually increases as the distance from the medium facing surface ABS increases and then maintains a specific width to the end of the second portion 14B.

Each of the first portion 14A and the second portion 14B has a top surface that is substantially flat. The first portion 14A has a bottom surface including a region closer to the medium facing surface ABS than a second position P2 located between the first position P1 and the medium facing surface ABS, this region being parallel to the top surface of the first portion 14A. Therefore, the first portion 14A includes the region closer to the medium facing surface ABS than the second position P2 that has a specific thickness D.

The bottom surface ABS than portion 14A also includes a region farther from the medium facing surface ABS than the second position P2, this region being farther from the top surface of the first portion 14A than the region of the bottom surface of the first portion 14A closer to the medium facing surface ABS than the second position P2. Therefore, the first portion 14A includes the region farther from the second medium facing surface ABS than the second position P2 that has a thickness greater than D.

In the bottom surface of the first portion 14A, the region farther from the medium facing surface ABS than the second position P2 includes a sloped surface 14a that is sloped so as to be farther from the top surface of the first portion 14A as the distance from the medium facing surface ABS increases. The sloped surface 14a and the top surface of the first portion 14A preferably form an angle θ equal to or greater than 25 degrees and smaller than 90 degrees. In FIG. 4(b) 'θ' indicates the angle formed between the sloped surface 14a and the portion of the bottom surface of the first portion 14A closer to the medium facing surface ABS than the second position P2. This angle is equal to the angle between the sloped surface 14a and the top surface of the first portion 14A.

The bottom surface of the second portion 14B is connected to an end of the sloped surface 14a farther from the medium facing surface ABS. The second portion 14B has a thickness that is uniform except a portion around the second portion 14B. The yoke layer 13 is in contact with the bottom surface of the second portion 14B of the main pole layer 14.

The main pole layer 14 has a first layer 141 touching the gap layer 9 (the insulating layer 9C) and a second layer 142 stacked on the first layer 141. An end of the first layer 141 closer to the medium facing surface ABS is located in the second position P2. The second layer 142 has an end face exposed from the medium facing surface ABS.

The second layer 142 preferably has a saturated flux density greater than that of the first layer 141. The first layer 141 may be made of an iron-nickel alloy, that is, Permalloy, or a high saturated flux density material as will be described later. The second layer 142 is preferably made of a high saturated flux density material of 1.4 T or greater. The high saturated flux density material may be a material including iron and nitrogen atoms, a material including iron, zirconia and oxygen atoms, or a material including iron and nickel elements, for example. To be specific, the high saturated flux density material may be at least one of the group consisting of NiFe (45 weight percent Ni and 55 weight percent Fe), FeN or a compound thereof, a Co amorphous alloy, Fe—Co, Fe—M that includes O (oxygen atoms) if required, and Fe—Co—M that includes O (oxygen atoms) if required. Here, M is at least one selected from the group consisting of Ni, N, C, B, Si, Al, Ti, Zr, Hf, Mo, Ta, Nb and Cu (each of which is a chemical symbol).

The main pole layer 14 has a thickness taken in the medium facing surface ABS that preferably falls within a range of 0.05 μm to 0.3 μm inclusive.

The surface of the main pole layer 14 exposed from the medium facing surface ABS preferably has a shape of trapezoid wherein the side closer to the gap layer 9 is smaller than the other side. The track width is defined by the side of the surface of the main pole layer 14 exposed from the medium facing surface ABS, the side being opposite to the gap layer 9. The track width is preferably falls within a range of 0.05 μm to 0.25 μm inclusive, and more preferably 0.08 μm to 0.16 μm inclusive.

The operation of the magnetic head of the embodiment will now be described. The magnetic head writes data on a recording medium by using the write head and reads data written on the recording medium by using the read head. In the write head the thin-film coil 10 generates a magnetic field that corresponds to the data to be written on the medium. The auxiliary pole layer 8, the main pole layer 14 and the yoke layer 13 form a magnetic path through which a magnetic flux corresponding to the magnetic field generated by the coil 10 pass. The main pole layer 14 allows the flux corresponding to the field generated by the roil 10 to pass and generates a write magnetic field used for writing the data on the medium through the use of the vertical magnetic recording system.

A method of manufacturing the magnetic head of the embodiment will now be described. First, the insulating layer 2 is formed on the substrate 1. Next, on the insulating layer 2, the bottom shield layer 3 is formed. Next, on the bottom shield layer 3, an insulating film to be a portion of the insulating layer 4 is formed. On this insulating film, the MR element 5 and a lead not shown that is connected to the MR element 5 are formed. Next, the MR element 5 and the lead are covered with another insulating film to be another portion of the insulating layer 4, so that the MR element 5 and the lead are embedded in the insulating layer 4.

Next, on the insulating layer 4, the top shield layer 6 is formed on which the nonmagnetic layer 7 is formed. Next, the auxiliary pole layer 8 having a specific shape is formed on the nonmagnetic layer 7. Next, although not shown, the nonmagnetic layer 7 and the auxiliary pole layer 8 are covered with a nonmagnetic material such as alumina, and the nonmagnetic material is polished so that the auxiliary pole layer 8 is exposed, and the top surface of the auxiliary pole layer 8 is thereby flattened. Alternatively, without providing the nonmagnetic layer 7, a single magnetic layer that functions as both of the top shield layer 6 and the auxiliary pole layer 8 may be provided in place of the top shield layer 6 and the auxiliary pole layer 8.

Next, on the auxiliary pole layer 8, a nonconductive and nonmagnetic material such as alumina is sputtered to form the insulating layer 9A. Next, using known techniques of photolithography and dry etching, the contact hole 9a is formed in the region of the insulating layer 9A where the auxiliary pole layer 8 is to be coupled to the yoke layer 13.

Next, the thin-film coil 10 is formed on the insulating layer 9A, using known techniques of photolithography and film formation such as electroplating.

Next, using known techniques of photolithography, the insulating layer 9B with which at least the space between adjacent ones of the turns of the thin-film coil 10 is filled is formed. Here, although the insulating layer 9B is formed to cover the coil 10 completely, it is possible that another insulating layer covering the coil 10 and the insulating layer 9B is formed after the insulating layer 9B with which the space between adjacent ones of the turns of the thin-film coil 10 is filled is formed.

Next, using known techniques of photolithography and film formation such as electroplating, the yoke layer 13 is formed on the auxiliary pole layer 8 and the insulating layer 9B, the yoke layer 13 extending from the region in which the contact hole 9a is formed to a specific region toward the medium facing surface ABS.

Next, the insulating layer 9C is formed by sputtering to cover the insulating layers 9A and 9B and the yoke layer 13. Next, the surface of the insulating layer 9C is polished so that the yoke layer 13 is exposed, and the top surfaces of the insulating layer 9C and the yoke layer 13 are flattened.

Next, the main pole layer 14 is formed on the insulating layer 9C and the yoke layer 13. The method of forming the main pole layer 14 will be described in detail later. Next, the insulating layer 17 is formed around the main pole layer 14. The protection layer 18 is then formed to cover the main pole layer 14. After the main pole layer 14 is formed, it is preferred that a write shield layer is formed on the main pole layer 14, an insulating layer being provided between the main pole layer 14 and the write shield layer, before the protection layer 18 is formed. Next, wiring and terminals are formed on the protection layer 18, the substrate is separated into sliders, and processes such as polishing of the medium facing surface ABS and fabrication of rails for flying are performed. The magnetic head is thus completed.

Figure 5A:
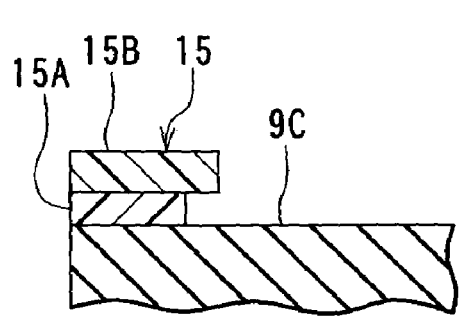
FIG. 5A and FIG. 5B are views for illustrating a method of forming the main pole layer of the embodiment.
Figure 5B:
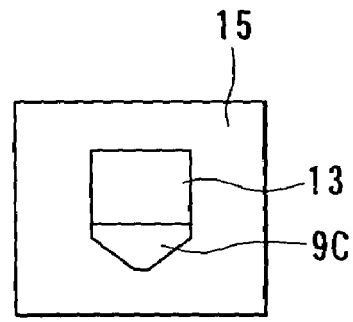

Reference is now made to FIG. 5A to FIG. 12A and FIG. 5B to FIG. 12B to describe the method of forming the main pole layer 14. FIG. 5A to FIG. 12A are cross sections orthogonal to the medium facing surface and the substrate surface. FIG. 5B to FIG. 12B each illustrate the top surface of the layered structure. According to the method of forming the main pole layer 14, as shown in FIG. 5A and FIG. 5B, a mask 15 is formed on the flattened top surfaces of the insulating layer 9C and the yoke layer 13. The mask 15 has an opening formed in the region in which the first layer 141 of the main pole layer 14 is to be disposed. The mask 15 has an undercut so that the bottom surface is smaller than the top surface. Such a mask 15 may be formed by patterning a resist layer made up of two organic films 15A and 15B stacked, for example.

Next, as shown in FIG. 6A and FIG. 6B, the insulating layer 9C and the yoke layer 13 are selectively etched through the use of the mask 15 to form a concave portion 151 in which the first layer 141 is to be disposed. At this time the concave portion 151 is made to have an end face 151a closer to the medium facing surface ABS (on the left side of FIG. 6A), the end face 151a being a sloped surface that is sloped such that the distance from the medium facing surface ABS increases as the depth of the sloped surface increases. Etching performed for making the concave portion 151 may be ion milling, for example. In this case, for example, the direction in which ion beams move form an angle of 0 to 20 degrees with respect to the direction orthogonal to the top surfaces of the insulating layer 9C and the yoke layer 13 before the concave portion 151 is formed. The arrows of FIG. 6A and FIG. 6B indicate the ion beams. Alternatively, reactive ion etching may be employed in place of ion milling.

Next, as shown in FIG. 7A and FIG. 7B, the first layer 141 is formed in the concave portion 151 by sputtering through the use of the mask 15: At this time the sloped surface 14a of the main pole layer 14 is formed by the end face 151a of the concave portion 151. Next, as shown in FIG. 8A and FIG. 8B, the mask 15 is lifted off.

Next, as shown in FIG. 9A and FIG. 9B, a magnetic layer 142A made of a magnetic material is formed by sputtering on the first layer 141 and the insulating layer 9C. The magnetic layer 142A is a layer used for making the second layer 142 and corresponds to the layer to be patterned of the invention.

Next, as shown in FIG. 10A and FIG. 10B, on the magnetic layer 142A, an etching mask 16 for patterning the magnetic layer 142A is formed. The etching mask 16 has a shape corresponding to the second layer 142 to be formed. The etching mask 16 has a portion disposed above the first layer 141 that is a little smaller than the first layer 141. The etching mask 16 may be made of a metal material, for example. Such an etching mask 16 may be formed by selectively etching a film formed by sputtering, for example.

Next, as shown in FIG. 11A and FIG. 11B, the magnetic layer 142A, the first layer 141, a portion of the insulating layer 9C and a portion of the yoke layer 13 are selectively etched, using the etching mask 16. This etching may be ion milling, for example. The arrows of FIG. 11A and FIG. 11B indicate ion beams. Alternatively, reactive ion etching may be employed in place of ion milling.

Figure 12A:
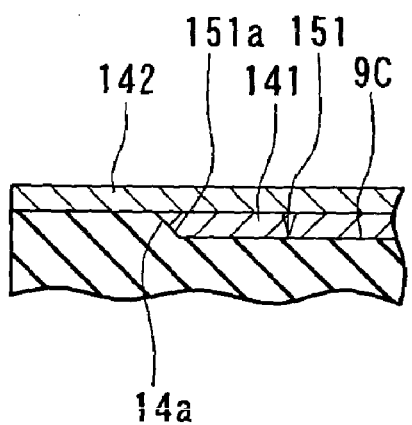
FIG. 12A and FIG. 12B are views for illustrating a step that follows the step shown in FIG. 1A and FIG. 11B.
Figure 12B:
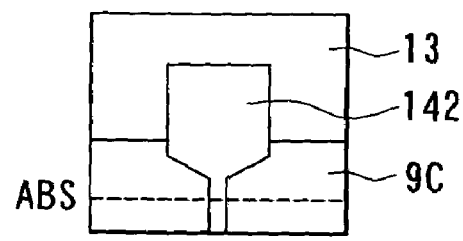

As shown in FIG. 12A and FIG. 12B, the magnetic layer 142A patterned by etching is the second layer 142. Through the foregoing etching step the periphery of the first layer 141 is etched and the first layer 141 is thereby patterned. In FIG. 12B the broken line indicates the position in which the medium facing surface ABS is to be formed later.

Next, although not shown, the insulating layer 17 is formed to cover the top surface of the layered structure. Next, the surface of the insulating layer 17 is polished by chemical mechanical polishing, for example, so that the second layer 142 is exposed. The top surfaces of the insulating layer 17 and the second layer 142 are thereby flattened, as shown in FIG. 1.

According to the embodiment, as described above, the magnetic layer 142A and the first layer 141 are etched through the use of the single etching mask 16, and the first layer 141 and the second layer 142 are thereby patterned. As a result, alignment of the first layer 141 and the second layer 142 is performed with accuracy. According to the embodiment, the first portion 14A of the main pole layer 14 that defines the track width has a thickness different from the other portion of the main pole layer 14. It is therefore important to form the first portion 14A with accuracy so as to prevent a reduction in writing characteristics of the magnetic head. According to the embodiment, alignment of the first layer 141 and the second layer 142 is performed with accuracy, as described above, so that the first portion 14A is formed with accuracy. It is thereby possible to implement excellent writing characteristics.

Alternatively, after the first layer 141 is formed, the top surfaces of the first layer 141 and the insulating layer 9C may be flattened by polishing before the second layer 142 is formed. This polishing is performed to reduce a small difference in level generated between the top surface of the first layer 141 and the top surface of the insulating layer 9C. Therefore, the top surface of the insulating layer 9C is not polished more than required through this polishing. The location of the end of the first layer 141 closer to the medium facing surface thus remains almost the same.

According to the embodiment, the top surface of the second layer 142 is flattened, so that, in the medium facing surface ABS, the end of the main pole layer 14 opposite to the gap layer 9 is flattened. As a result, in the medium facing surface ABS, the field generated from the main pole layer 14 is made consistent along the direction intersecting the tracks. Consequently, distortion of the bit pattern shape of the recording medium is suppressed, and the linear recording density is improved.

If the surface of the main pole layer 14 exposed from the medium facing surface is made to have a shape of trapezoid wherein the side closer to the gap layer 9 is smaller than the other side, ion milling may be performed to pattern the second layer 142, such that the direction in which ion beams move is tilted with respect to the direction orthogonal to the top surface of the second layer 142, for example.

Figure 13:
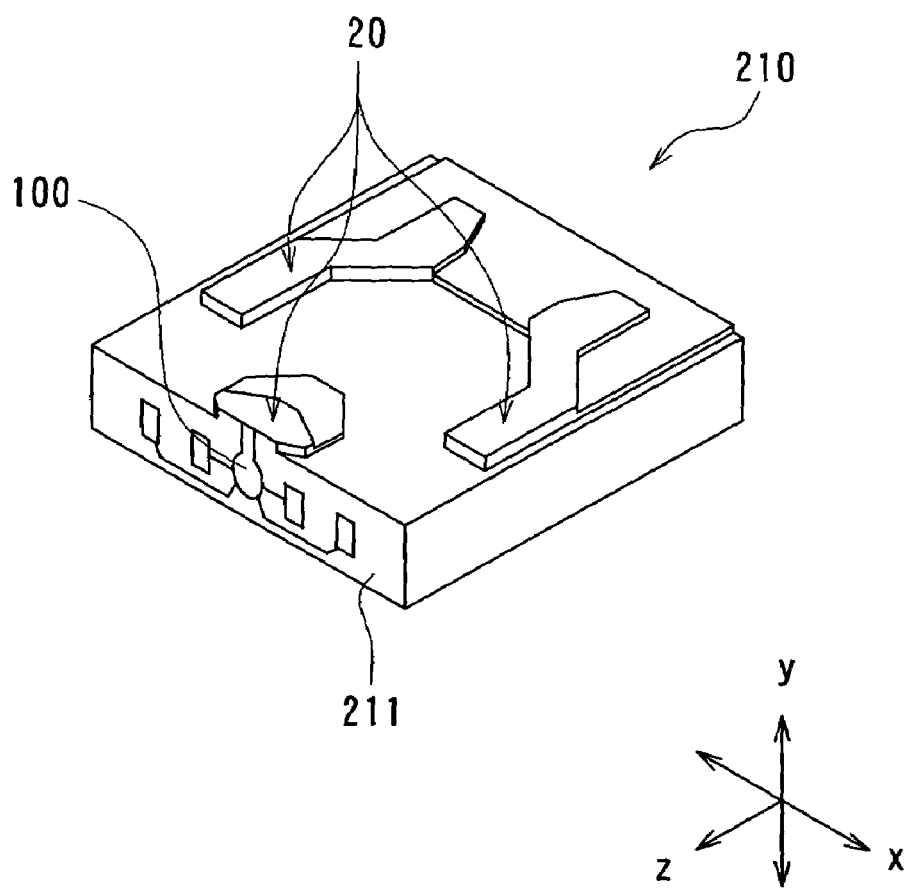
FIG. 13 is a perspective view that illustrates a slider incorporated in a head gimbal assembly of the embodiment of the invention.

A head gimbal assembly and a hard disk drive of the embodiment will now be described. Reference is made to FIG. 13 to describe a slider 210 incorporated in the head gimbal assembly. In the hard disk drive the slider 210 is placed to face toward a hard disk platter that is a circular-plate-shaped recording medium to be rotated and driven. The slider 210 has a base body 211 made up mainly of the substrate 1 and the protection layer 18 of FIG. 1. The base body 211 is nearly hexahedron-shaped. One of the six surfaces of the base body 211 faces toward the hard disk platter. An air bearing surface 20 that is the medium facing surface is formed in this one of the surfaces. When the hard disk platter rotates in the z direction of FIG. 13, an airflow passes between the hard disk platter and the slider 210 and a lift is thereby generated below the slider 210 in the y direction of FIG. 13 and exerted on the slider 210. The slider 210 flies over the hard disk platter by means of the lift. The x direction of FIG. 13 is across the tracks of the hard disk platter. A magnetic head 100 of the embodiment is formed near the air-outflow-side end (the end located at the lower left of FIG. 13) of the slider 210.

Figure 14:
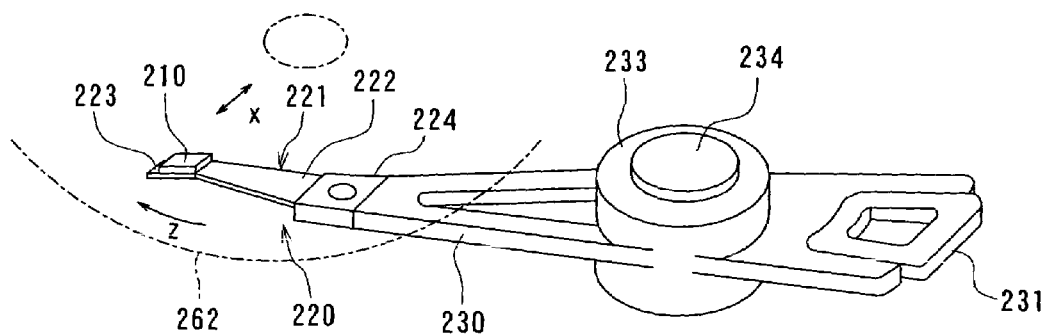
FIG. 14 is a perspective view that illustrates a head arm assembly including the head gimbal assembly of the embodiment.

Reference is now made to FIG. 14 to describe a head gimbal assembly 220 of the embodiment. The head gimbal assembly 220 comprises the slider 210 and a suspension 221 that flexibly supports the slider 210. The suspension 221 incorporates: a plate-spring-shaped load beam 222 made of stainless steel, for example; a flexure 223 to which the slider 210 is joined, the flexure being located at an end of the load beam 222 and giving an appropriate degree of freedom to the slider 210; and a base plate 224 located at the other end of the load beam 222. The base plate 224 is attached to an arm 230 of an actuator for moving the slider 210 along the x direction across the tracks of the hard disk platter 262. The actuator incorporates the arm 230 and a voice coil motor that drives the arm 230. A gimbal section for maintaining the orientation of the slider 210 is provided in the portion of the flexure 223 on which the slider 210 is mounted.

The head gimbal assembly 220 is attached to the arm 230 of the actuator. An assembled body comprising the arm 230 and the head gimbal assembly 220 attached to the arm 230 is called a head arm assembly. An assembled body comprising a carriage having a plurality of arms wherein the head gimbal assembly 220 is attached to each of the arms is called a head stack assembly.

FIG. 14 illustrates an example of the head arm assembly. In the head arm assembly the head gimbal assembly 220 is attached to an end of the arm 230. A coil 231 that is part of the voice coil motor is fixed to the other end of the arm 230. A bearing 233 is provided in the middle of the arm 230. The bearing 233 is attached to an axis 234 that rotatably supports the arm 230.

Figure 15:
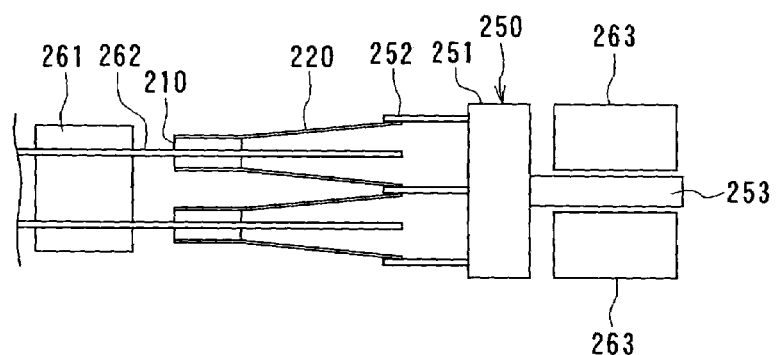
FIG. 15 illustrates the main part of a hard disk drive of the embodiment.
Figure 16:
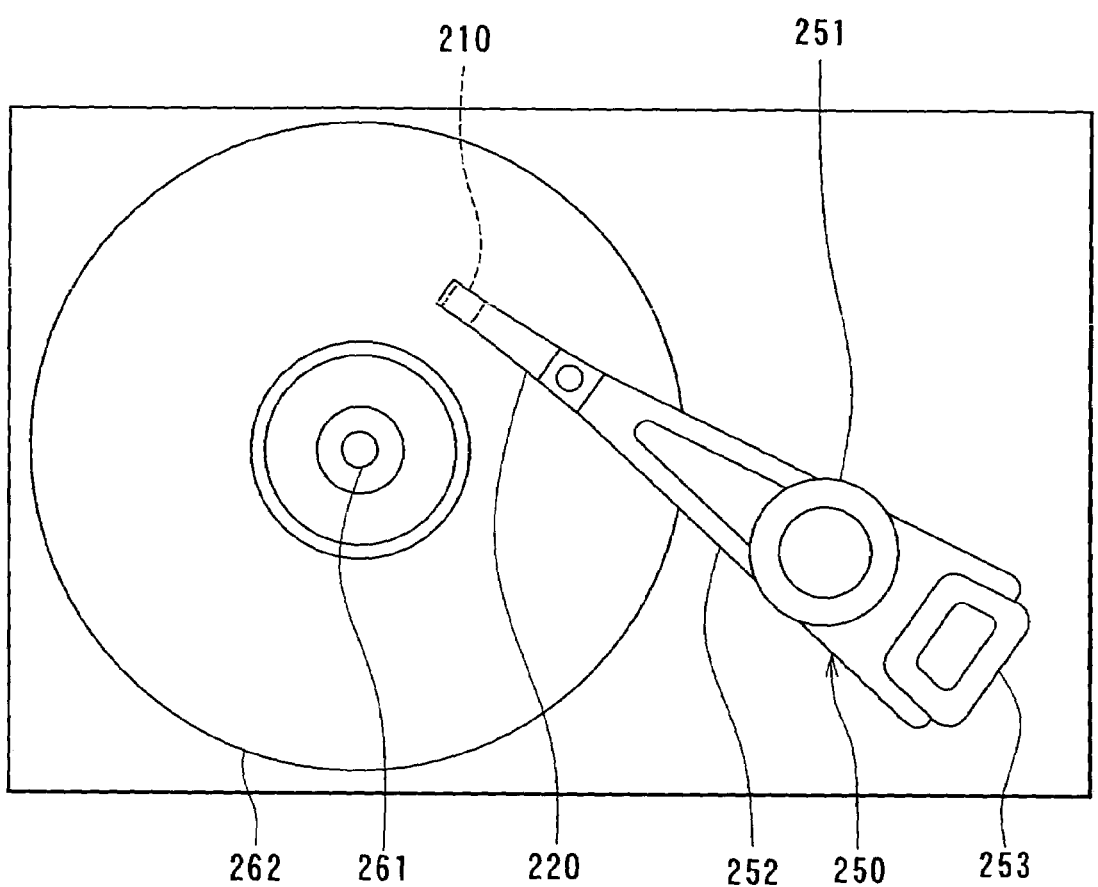
FIG. 16 is a top view of the hard disk drive of the embodiment.

Reference is now made to FIG. 15 and FIG. 16 to describe an example of the head stack assembly and the hard disk drive of the embodiment. FIG. 15 illustrates the main part of the hard disk drive. FIG. 16 is a top view of the hard disk drive. The head stack assembly 250 incorporates a carriage 251 having a plurality of arms 252. A plurality of head gimbal assemblies 220 are attached to the arms 252 such that the assemblies 220 are arranged in the vertical direction with spacing between adjacent ones. A coil 253 that is part of the voice coil motor is mounted on the carriage 251 on a side opposite to the arms 252. The head stack assembly 250 is installed in the hard disk drive. The hard disk drive includes a plurality of hard disk platters 262 mounted on a spindle motor 261. Two of the sliders 210 are allocated to each of the platters 262, such that the two sliders 210 are opposed to each other with each of the platters 262 disposed in between. The voice coil motor includes permanent magnets 263 disposed to be opposed to each other, the coil 253 of the head stack assembly 250 being placed between the magnets 263.

The actuator and the head stack assembly 250 except the sliders 210 correspond to the alignment device of the invention and support the sliders 210 and align them with respect to the hard disk platters 262.

In the hard disk drive of the embodiment the actuator moves the slider 210 across the tracks of the hard disk platter 262 and aligns the slider 210 with respect to the hard disk platter 262. The magnetic head 100 incorporated in the slider 210 writes data on the hard disk platter 262 through the use of the write head and reads data stored on the hard disk platter 262 through the use of the read head.

Figure 17:
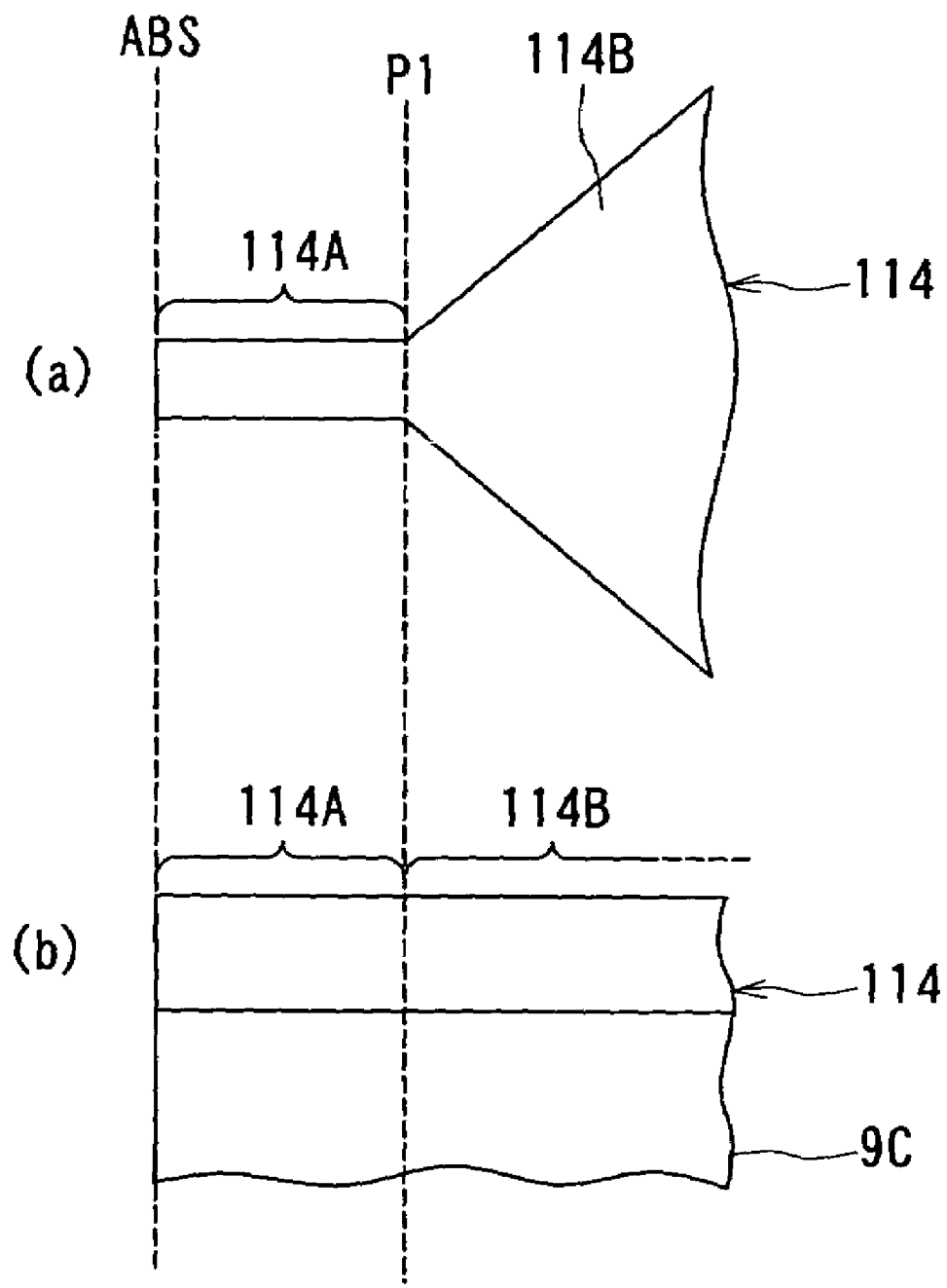
FIG. 17 illustrates the shape of a main pole layer of a first reference example.
Figure 18:
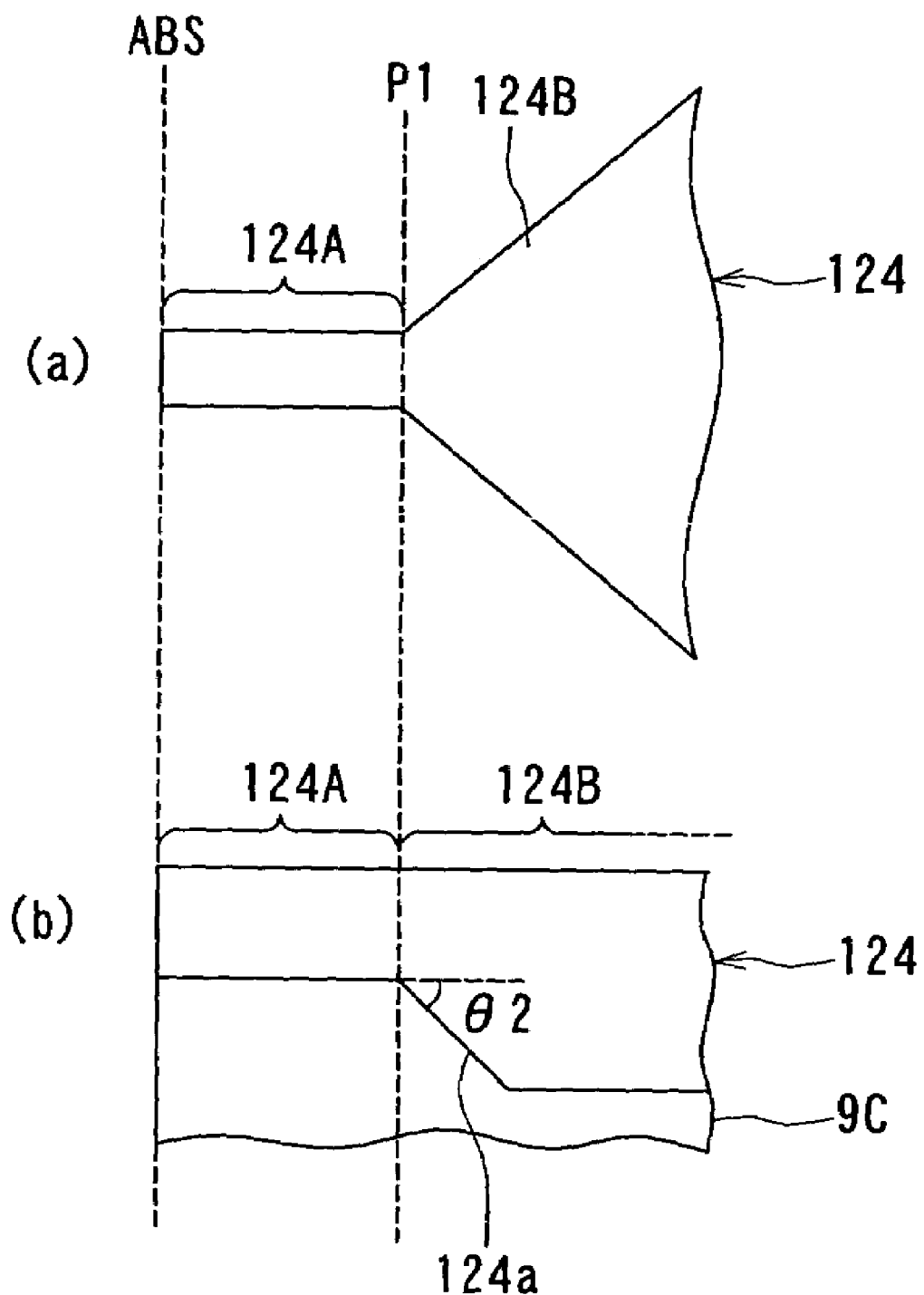
FIG. 18 illustrates the shape of a main pole layer of a second reference example.

The following is a description of a first simulation performed to determine the effect produced by the shape of the main pole layer 14 of the embodiment. According to the first simulation, vertical components of write magnetic field generated from the main pole layer 14 were obtained for a model of the main pole layer 14 of the embodiment and models of two reference main pole layers. FIG. 17 illustrates the shape of the main pole layer 114 of the first reference example. FIG. 18 illustrates the shape of the main pole layer 124 of the second reference example. FIG. 17(a) and FIG. 18 (a) illustrate the top surfaces of portions of the main pole layers 114 and 124 near the medium facing surface ABS. FIG. 17(b) and FIG. 18(b) illustrate cross sections of the portions of the main pole layers 114 and 124 near the medium facing surface ABS.

The main pole layer 114 of the first reference example shown in FIG. 17 has a first portion 114A and a second portion 114B. The first portion 114A and the second portion 114B have plane geometries similar to those of the first portion 14A and the second portion 14B of the main pole layer 14 of the embodiment. In the first reference example, however, the main pole layer 114 has flat top and bottom surfaces and has a thickness that is uniform throughout, which is different from the embodiment. In the first simulation the main pole layer 114 has a thickness of 0.2 µm.

The main pole layer 124 of the second reference example shown in FIG. 18 has a first portion 124A and a second portion 124B. The first portion 124A and the second portion 124B have plane geometries similar to those of the first portion 14A and the second portion 14B of the main pole layer 14 of the embodiment. In addition, the main pole layer 124 has a flat top surface. In the second reference example, however, the first portion 124A has a thickness that is uniform throughout, which is different from the embodiment. The second portion 124B has a bottom surface including a sloped surface 124a that is located in a region farther from the medium facing surface ABS than the first position P1 and sloped such that the distance from the top surface of the second portion 124B increases as the distance from the medium facing surface ABS increases. In the first simulation the sloped surface 124a and the top surface of the first portion 124A form angle θ2 of 45 degrees. The first position P1 is located at a distance of 0.3 µm from the medium facing surface ABS. The first portion 124A has a thickness of 0.2 µm. The second portion 124B has a maximum thickness of 0.3 µm.

In the first simulation the sloped surface 14a and the top surface of the first portion 14A of the main pole layer 14 of the embodiment form angle θ of 45 degrees. The first position P1 is located at a distance of 0.3 µm from the medium facing surface ABS. The second position P2 is located at a distance of 0.1 µm from the medium facing surface ABS. The first portion 14A has a thickness of 0.2 µm. The second portion 14B has a maximum thickness of 0.3 µm.

Figure 19:
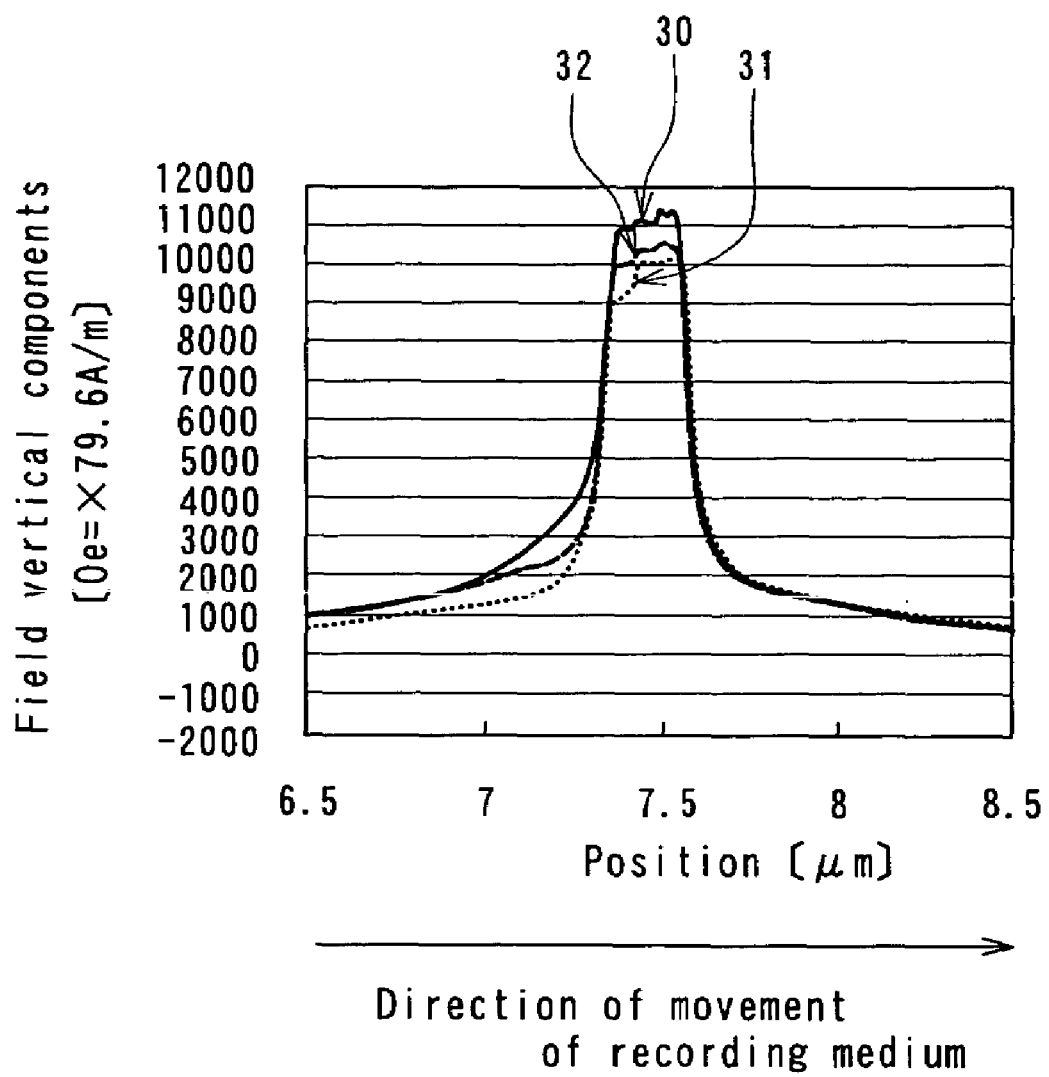
FIG. 19 is a plot that shows a result of simulation for obtaining vertical components of the write magnetic field generated from the main pole layer.

FIG. 19 shows the results of vertical components of write magnetic fields generated from the main pole layer 14 obtained for the above-mentioned three models. In FIG. 19 the horizontal axis indicates positions along the direction of movement of the recording medium and the vertical axis indicates vertical components of write magnetic fields. The positions in the horizontal axis are each expressed by the distance from the interface between the nonmagnetic layer 7 and the auxiliary pole layer 8.

In FIG. 19 numeral 30 indicates the characteristic of the model of the embodiment. Numeral 31 indicates the characteristic of the model of the first reference example. Numeral 32 indicates the characteristic of the model of the second reference example. The maximum value of vertical components of the write magnetic field is 11393 [Oe=×79.6 A/m] for the model of the embodiment, 10184 [Oe=×79.6 A/m] for the model of the first reference example, and 10562 [Oe=×79.6 A/m] for the model of the second reference example.

According to the embodiment, as this result shows, the maximum value of vertical components of the write magnetic field is made greater by 1200 [Oe] or greater than that of the first reference example wherein the main pole layer has a uniform thickness. According to the embodiment, the maximum value of vertical components of the write magnetic field is made greater by 800 [Oe] or greater than that of the second reference example wherein the point at which the thickness of the main pole layer starts to increase coincides with the point at which the width of the main pole layer starts to increase. According to an experiment other than the first simulation, the overwrite property of the write head increases by approximately 5 dB if the maximum value of vertical components of the write magnetic field of the simulation increases by 1000 [Oe]. Consequently, according to the embodiment, it is expected that the overwrite property is improved by 6 dB or greater, compared to the first reference example, and by 4 dB or greater, compared to the second reference example.

The following is a description of the result of the second simulation performed for obtaining the relationship between the writing characteristic of the magnetic head and the degree of angle θ between the sloped surface 14a and the top surface of the first portion 14A of the main pole layer 14. Prior to the second simulation, an experiment was performed to find out the relationship between the condition of etching for forming the concave portion 151 and the state of the end face 151a of the concave portion 151. In this experiment the concave portion 151 was formed by ion milling. The ion milling was performed such that the direction in which ion beams moved formed four types of angles of 0, 10, 15 and 20 degrees with respect to the direction orthogonal to the top surfaces of the insulating layer 9C and the yoke layer 13 before the concave portion 151 was formed. These angles will be hereinafter called ion beam angles. In the experiment the angle between the end face 151a and the top surface of the insulating layer 9C before the concave portion 151 was formed was measured for each of the concave portions 151 formed under the four types of conditions. These angles will be hereinafter called end face angles. The relationship between the ion beam angles and the end face angles is as follows. If the ion beam angles were 0, 10, 15 and 20 degrees, the end face angles were 58.9, 42.6, 35 and 24.8 degrees, respectively. In the experiment the concave portion 151 was formed by reactive ion etching, wherein the end face angle was 82.5 degrees.

Figure 20:
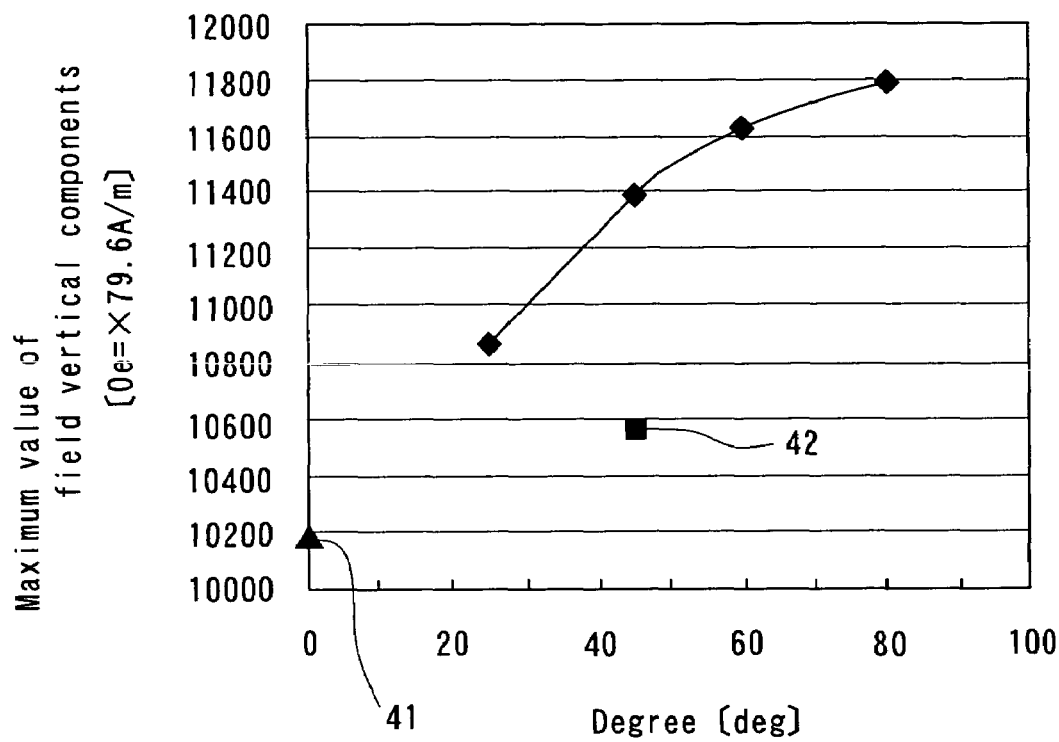
FIG. 20 is a plot that shows a result of simulation for determining the relationship between the angle of the end face of the main pole and the maximum value of vertical components of the write magnetic field.

Next, the second simulation was performed to obtain the relationship between the above-mentioned end face angles and the maximum values of vertical components of write magnetic fields FIG. 20 shows the result, wherein the horizontal axis indicates the end face angles and the vertical axis indicates the maximum values of vertical components of write magnetic fields. In FIG. 20 the dots indicated with numeral 41 represent the values of the first model shown in FIG. 17. The dots indicated with numeral 42 represent the values of the second model shown in FIG. 18. The other four dots of FIG. 20 represent the values where the end face angles of the model of the embodiment were 24.8, 42.6, 58.9 and 82.5 degrees. The remainder of conditions of the second simulation were the same as those of the first simulation.

As shown in the result of FIG. 20, it is noted that the maximum value of vertical components of the write magnetic field is increased by increasing the end face angle. As shown in the result of FIG. 20, it is noted that the vertical components of the write field are greater, compared to the first and second reference examples, if the end face angle is approximately 25 degrees or greater. On the other hand, if the end face angle is 90 degrees or greater, the edge generated in the bottom surface of the main pole layer 14 forms an acute angle and flux leakage from this edge is likely to occur. Therefore, the end face angle is preferably 25 degrees or greater and smaller than 90 degrees. As shown in the result of FIG. 20, it is considered that, if the end face angle is approximately 40 degrees or greater, the maximum value of vertical components of the write field is increased by 1000 [Oe] or greater, and the overwrite property of the write head is improved by 5 dB or greater, compared to the first reference example. Therefore, more preferably, the end face angle is 40 degrees or greater and smaller than 90 degrees.

Figure 21:
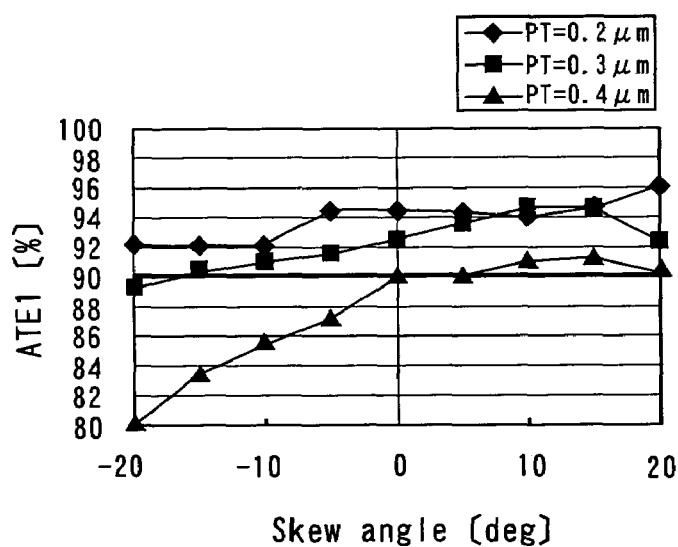
FIG. 21 is a plot that shows a result of a first experiment relating to the embodiment of the invention.
Figure 22:
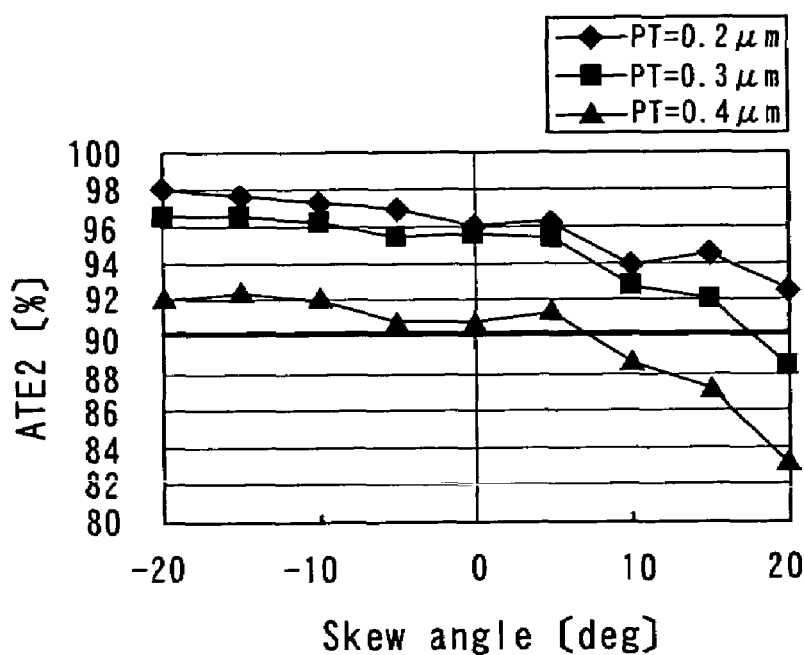
FIG. 22 is another plot that shows a result of the first experiment relating to the embodiment of the invention.
Figure 23:
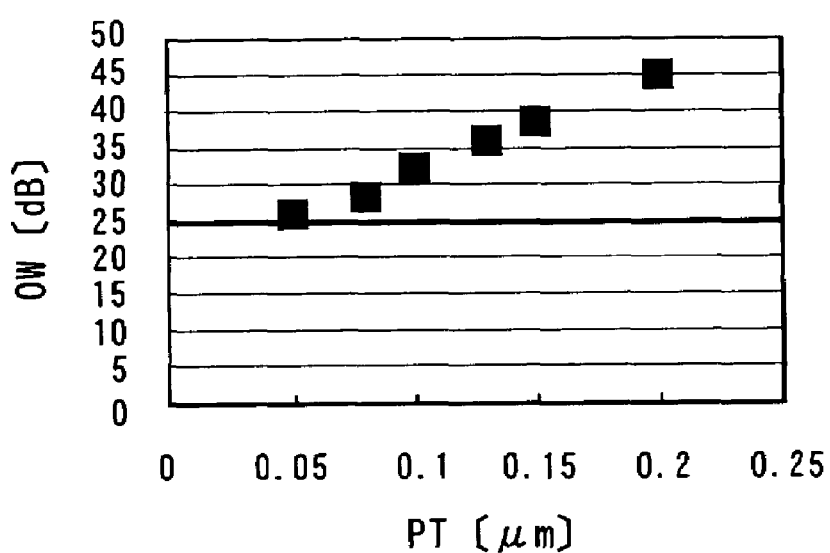
FIG. 23 is another plot that shows a result of a second experiment relating to the embodiment of the invention.

Reference is now made to FIG. 21 to FIG. 23 to describe the results of two experiments indicating that the thickness of the main pole layer 14 of the embodiment taken in the medium facing surface ABS should preferably fall within a range of 0.05 to 0.3 µm inclusive. In the following description the thickness of the main pole layer 14 taken in the medium facing surface ABS is called a main pole thickness and indicated with PT.

In the first experiment the relationship among the main pole thickness PT, the skew angle and the side erase suppressing property was determined. Side erase means a phenomenon in which, when data is written on a specific track, data on an adjacent track is erased. The side erase suppressing property indicates the capability of suppressing such side erase. In the first experiment three magnetic heads whose main pole thicknesses PT were 0.2 µm, 0.3 µm and 0.4 µm, respectively, were fabricated. In each of these magnetic heads the surface of the main pole layer 14 exposed from the medium facing surface ABS had a side opposite to the gap layer 9 having a length of 0.18 µm. This length is hereinafter called a pole width.

The side erase suppressing property was measured in the following manner. First, data was written on each of neighboring three tracks, using a signal at a frequency of 249 MHz, a signal at a frequency of 250 MHz, and a signal at a frequency of 249 MHz, respectively. Next, the data was read from the outer track, and the magnitude of a component of a frequency of 249 MHz of the read signal obtained was defined as TAA1. Furthermore, the data was read from the inner track, and the magnitude of a component of a frequency of 249 MHz of the read signal obtained was defined as TAA2. Next, data was written on the middle track 100 times, us frequency of 250 MHz. Next, the data was read from the outer track, and the magnitude of a component of a frequency of 249 MHz of the read signal obtained was defined as TAA3. Furthermore, the data was read from the inner track, and the magnitude of a component of a frequency of 249 MHz of the read signal obtained was defined as TAA4. The side erase suppressing property ATE1 for the outer track and the side erase suppressing property ATE2 for the inner track were obtained through the use of the two equations below.

$ATE1(\%) = (TAA3/TAA1) \times 100$ $ATE2(\%) = (TAA4/TAA2) \times 100$

Here, the skew angle is expressed in a negative value wherein the skew angle is generated when the magnetic head is located in an inner position than the position in which the skew angle is 0 degree. The skew angle is expressed in a positive value wherein the skew angle is generated when the magnetic head is located in an outer position than the position in which the skew angle is 0 degree.

In the first experiment the side erase suppressing properties ATE1 and ATE2 were measured with different skew angles for each of the three magnetic heads, and the relationship among the main pole thickness PT, the skew angle, and the side erase suppressing properties ATE1 and ATE2 was obtained.

The table below and FIG. 21 show the relationship among the main pole thicknesses PT, the skew angles, and the side erase suppressing properties ATE1. In the table the figures under the items 'PT=0.2 μm', 'PT=0.3 μm' and 'PT=0.4 μm' represent the side erase suppressing properties ATE1 (%) wherein the main pole thicknesses PT were 0.2 μm, 0.3 μm and 0.4 μm, respectively.

TABLE 1

| Skew angle (deg) | PT = 0.2 μm | PT = 0.3 μm | PT = 0.4 μm |
| --- | --- | --- | --- |
| −20 | 92.25 | 89.33 | 80.20 |
| −15 | 92.12 | 90.33 | 83.54 |
| −10 | 92.14 | 90.97 | 85.52 |
| −5 | 94.47 | 91.54 | 87.24 |
| 0 | 94.52 | 92.54 | 90.10 |
| 5 | 94.40 | 93.65 | 90.08 |
| 10 | 94.05 | 94.64 | 91.20 |
| 15 | 94.79 | 94.61 | 91.43 |
| 20 | 96.17 | 92.31 | 90.38 |

The table below and FIG. 22 show the relationship among the main pole thicknesses PT, the skew angles, and the side erase suppressing properties ATE2. In the table the figures under the items 'PT=0.2 μm', 'PT=0.3 μm' and 'PT=0.4 μm' represent the side erase suppressing properties ATE2 (%) wherein the main pole thicknesses PT were 0.2 μm, 0.3 μm and 0.4 μm, respectively.

TABLE 2

| Skew angle (deg) | PT = 0.2 μm | PT = 0.3 μm | PT = 0.4 μm |
| --- | --- | --- | --- |
| −20 | 98.05 | 96.59 | 92.13 |
| −15 | 97.68 | 96.55 | 92.42 |
| −10 | 97.28 | 96.20 | 92.12 |
| −5 | 96.93 | 95.44 | 90.95 |
| 0 | 96.08 | 95.67 | 90.85 |
| 5 | 96.21 | 95.33 | 91.45 |
| 10 | 93.91 | 92.81 | 88.71 |
| 15 | 94.50 | 92.07 | 87.24 |
| 20 | 92.57 | 88.40 | 83.20 |

The side erase suppressing properties ATE1 and ATE2 indicate that the side erase is suppressed to a greater degree where the value is greater. It is referred that each of the side erase suppressing properties ATE1 and ATE2 is 90 percent or greater. As shown in the two tables above, FIG. 21 and FIG. 22, it is noted that, if the main pole thickness PT is 0.3 μm or smaller, each of the side erase suppressing properties ATE1 and ATE2 is 90 percent or greater except when the skew angle is around −20 degrees or 20 degrees. Therefore, the main pole thickness PT is preferably 0.3 μm or smaller.

The second experiment will now be described. In the second experiment the relationship between the main pole thickness PT and the overwrite property OW was determined, wherein six magnetic heads whose main pole thicknesses PT were 0.20 μm, 0.15 μm, 0.13 μm, 0.10 μm, 0.08 μm and 0.05 μm were fabricated. In each of these magnetic heads the pole width was 0.12 μm, the distance between the medium facing surface ABS and the first position P1 was 0.3 μm, the distance between the medium facing surface ABS and the second position P2 was 0.2 μm, and the angle θ between the sloped surface 14a and the top surface of the first portion 14A was 45 degrees.

The overwrite property OW was measured in the following manner. First, data was written on a specific track, using a signal at a frequency of 300 MHz. Next, the data was read from the track, and the magnitude of a component of a frequency of 300 MHz of the read signal obtained was defined as TAA5. Next, data was written over the same track, using a signal at a frequency of 50 MHz. Next, the data was read from the track, and the magnitude of a component of a frequency of 300 MHz of the read signal obtained was defined as TAA6. The overwrite property OW was obtained through the use of the equation below.

$OW(dB) = 20 \log_{10}(TAA6/TAA5)$

The table below and FIG. 23 show the relationship between the main pole thickness PT and the overwrite property OW. The table shows vertical components of the write magnetic field (Oe=×79.6 A/m), too.

TABLE 3

| PT (μm) | OW (dB) | field vertical components (Oe) |
| --- | --- | --- |
| 0.20 | 45.0 | 11393 |
| 0.15 | 38.6 | 10122 |
| 0.13 | 36.1 | 9613 |
| 0.10 | 32.3 | 8850 |
| 0.08 | 28.3 | 8341 |
| 0.05 | 25.9 | 7578 |

The greater value of overwrite property OW indicates a greater overwriting capability. The overwrite property OW of at least 25 dB is required and 30 dB or greater is preferred. As shown in the above table and FIG. 23, it is required that the main pole thickness PT is 0.05 µm or greater to obtain the overwrite property OW of 25 dB or greater.

As the foregoing two experiments show, it is preferable that the thickness of the main pole layer 14 taken in the medium facing surface ABS should fall within a range of 0.05 to 0.3 µm inclusive.

According to the magnetic head of the embodiment as thus described, the second position P2 in which the thickness of the main pole layer 14 starts to increase is located between the medium facing surface ABS and the first position P1 in which the width of the main pole layer 14 starts to increase. It is thereby possible to reduce the thickness of the main pole layer 14 in the medium facing surface ABS to prevent writing on an adjacent track and to suppress a reduction in write field intensity.

According to the embodiment, in the region between the medium facing surface ABS and the second position P2, each of the width and the thickness of the first portion 14A of the main pole layer 14 is uniform, regardless of the distance from the medium facing surface ABS. Consequently, in the course of the manufacturing process of the magnetic head, even if the point at which polishing is stopped is slightly shifted when the medium facing surface ABS is formed by polishing, the width and the thickness of the main pole layer 14 taken in the medium facing surface ABS remain the same. As a result, according to the embodiment, mass-production of uniform magnetic heads is achieved.

According to the embodiment, the first portion 14A of the main pole layer 14 has a substantially flat surface that is located opposite to the gap layer 9, that is, located forward in the direction T of movement of the recording medium (the air-outflow-side end of the slider). It is thereby possible to make steep changes in vertical components of write magnetic field with respect to the direction T of movement of the recording medium. As a result, an improvement in recording density is achieved.

According to the embodiment, the main pole layer 14 has the first layer 141 touching the gap layer 9 and has the second layer 142 stacked on the first layer 141. The first layer 141 has an end that is closer to the medium facing surface ABS and located in the second position P2. The second layer 142 has an end face exposed from the medium facing surface ABS. Such a configuration of the main pole layer 14 having the two layers 141 and 142 facilitates formation of the main pole layer 14.

According to the embodiment, the second layer 142 has a saturated flux density greater than that of the first layer 141. It is thereby possible to prevent the magnetic flux passing through the main pole layer 14 from leaking halfway through the main pole layer 14, especially in the first position P1 and the second position P2, and to introduce the flux to the end on a side of the medium facing surface ABS with efficiency.

According to the embodiment, the first portion 14A has the surface (the bottom surface) closer to the gap layer 9 including the region farther from the medium facing surface ABS than the second position P2, this region including the sloped surface 14a that is sloped such that the distance from the surface (the top surface) of the first portion 14A farther from the gap layer 9 increases as the distance from the medium facing surface ABS increases. It is thereby possible to prevent the magnetic flux passing through the main pole layer 14 from leaking halfway through the main pole layer 14, and to increase vertical components of the write magnetic field generated from the main pole layer 14.

According to the embodiment, the thickness of the main pole layer 14 taken in the medium facing surface ABS falls within a range of 0.05 µm to 0.3 µm inclusive. Such a reduction in the thickness of the main pole layer 14 taken in the medium facing surface ABS prevents writing on an adjacent track with greater reliability.

According to the embodiment, it is possible that the main pole layer 14 has the surface exposed from the medium facing surface ABS, this surface having a shape of trapezoid wherein the side closer to the gap layer 9 is smaller than the other side. In this case, writing on an adjacent track is prevented with greater reliability.

According to the embodiment, the yoke layer 13 is in contact with the surface of the second portion 14B of the main pole layer 14 closer to the gap layer 9. It is thereby possible to prevent damage to the yoke layer 13 when the main pole layer 14 is patterned by etching.

According to the embodiment, before the first layer 141 of the main pole layer 14 is formed, the gap layer 9 is etched to form the concave portion 151, in which the first layer 141 is to be disposed, in the top surface of the gap layer 9. The first layer 141 is formed in the concave portion 151. Formation of the main pole layer 14 is thereby made easier.

According to the embodiment, in the step of forming the concave portion 151, the end face 151a of the concave portion 151 closer to the medium facing surface ABS is made a sloped surface that is sloped such that the distance from the medium facing surface ABS increases as the depth of the sloped surface increases. The sloped surface 14a of the main pole layer 14 is made up of the end face 151a. It is thereby possible to prevent the magnetic flux passing through the main pole layer 14 from leaking halfway through the main pole layer 14, and to increase vertical components of the write magnetic field generated from the main pole layer 14.

According to the embodiment, the step of flattening the top surfaces of the gap layer 9 and the first layer 141 of the main pole layer 14 may be included between the step of forming the first layer 141 and the step of forming the second layer 142 of the main pole layer 141. In this case, a slight difference in level between the top surfaces of the gap layer 9 and the first layer 141 is eliminated so that the main pole layer 14 is formed with accuracy.

The head gimbal assembly and the hard disk drive of the embodiment exhibit effects similar to those of the foregoing magnetic head of the embodiment.

The present invention is not limited to the foregoing embodiment but may be practiced in still other ways. For example, in the foregoing embodiment, the magnetic head is disclosed, having such a configuration that the read head is formed on the base body and the write head is stacked on the read head. Alternatively, the read head may be stacked on the write head.

According to the magnetic head for vertical magnetic recording, the head gimbal assembly or the hard disk drive of the invention described so far, the second position in which the thickness of the main pole layer starts to change is located between the medium facing surface and the first position in which the width of the main pole layer starts to change. According to the invention, it is thereby possible to prevent writing on an adjacent track and to suppress a reduction in write field intensity. According to the magnetic head for vertical magnetic recording of the invention, the first portion of the main pole layer has the region between the medium facing surface and the second position, the region having a uniform width and a uniform thickness, regardless of the distance from the medium facing surface.

Consequently, according to the invention, in the course of the manufacturing process of the magnetic head, even if the point at which polishing is stopped is slightly shifted when the medium facing surface is formed by polishing, the width and the thickness of the main pole layer taken in the medium facing surface remain the same. As a result, according to the invention, the magnetic head for vertical magnetic recording suitable for mass-production is achieved. According to the invention, the first portion of the main pole layer has a substantially flat surface that is located opposite to the gap layer. It is thereby possible to make steep changes in vertical components of the write magnetic field with respect to the direction of movement of the recording medium. As a result, an improvement in recording density is achieved.

According to the magnetic head for vertical magnetic recording of the invention, the main pole layer may incorporate the first layer touching the gap layer and the second layer stacked on the first layer. The first layer may have an end that is closer to the medium facing surface and located in the second position. The second layer may have an end face exposed from the medium facing surface. In this case, the main pole layer is easily formed.

According to the magnetic head for vertical magnetic recording of the invention, the second layer may have a saturated flux density greater than that of the first layer. In this case, it is possible to prevent the magnetic flux passing through the main pole layer from leaking halfway through the main pole layer and to introduce the flux to the end on a side of the medium facing surface with efficiency.

According to the magnetic head for vertical magnetic recording of the invention, the first portion of the main pole layer has the first surface including the region farther from the medium facing surface than the second position, and this region may include the sloped surface that is sloped such that the distance from the second surface increases as the distance from the medium facing surface increases. In this case, it is possible to prevent the magnetic flux passing through the main pole layer from leaking halfway through the main pole layer, and to increase vertical components of the write magnetic field generated from the main pole layer.

According to the magnetic head for vertical magnetic recording of the invention, the thickness of the main pole layer taken in the medium facing surface may fall within a range of 0.05 μm to 0.3 μm inclusive. In this case, writing on an adjacent track is prevented with greater reliability.

According to the magnetic head for vertical magnetic recording of the invention, the surface of the main pole layer exposed from the medium facing surface may have a shape of trapezoid wherein the side closer to the gap layer is smaller than the other side. In this case, writing on an adjacent track is prevented with greater reliability.

According to the magnetic head for vertical magnetic recording of the invention, the yoke layer may be in contact with the surface of the second portion of the main pole layer closer to the gap layer. In this case, it is possible to prevent damage to the yoke layer when the main pole layer is patterned.

The method of manufacturing the magnetic head for vertical magnetic recording of the invention has the effects similar to those of the magnetic head for vertical magnetic recording of the invention, that is, it is possible to prevent writing on an adjacent track, to suppress a reduction in write field strength, and to implement the magnetic head for vertical magnetic recording suitable for mass-production. According to the method of the invention, it is further possible to make steep changes in vertical components of the write magnetic field with respect to the direction of movement of the recording medium. As a result, an improvement in recording density is achieved. According to the invention, the step of forming the main pole layer includes the steps of: forming the first layer touching the gap layer and having an end that is closer to the medium facing surface and located in the second position; and forming the second layer on the first layer, the second layer having an end face exposed from the medium facing surface. According to the invention, formation of the main pole layer is thereby facilitated.

According to the method of manufacturing the magnetic head for vertical magnetic recording of the invention, the step of forming the main pole layer may include, before the step of forming the first layer, the step of forming the concave portion, in which the first layer is to be disposed, in the top surface of the gap layer by etching the gap layer, and the first layer may be formed in the concave portion in the step of forming the first layer. In this case, formation of the main pole layer is further facilitated.

According to the method of manufacturing the magnetic head for vertical magnetic recording of the invention, in the step of forming the concave portion, the end face of the concave portion closer to the medium facing surface may be made a sloped surface that is sloped such that the distance from the medium facing surface increases as the depth of the sloped surface increases. In this case, it is possible to prevent the magnetic flux passing through the main pole layer from leaking halfway through the main pole layer, and to increase vertical components of the write magnetic field generated from the main pole layer.

According to the method of manufacturing the magnetic head for vertical magnetic recording of the invention, the step of forming the second layer may include the steps of: forming the layer to be patterned for forming the second layer on the first layer; forming the etching mask for patterning the layer to be patterned on the layer to be patterned; and selectively etching the layer to be patterned and the first layer, using the etching mask. In this case, in the step of etching, the layer to be patterned is patterned so that the second layer is formed and the first layer is patterned. According to the invention, alignment of the first and second layers is performed with accuracy and excellent writing characteristics are thereby achieved.

According to the method of manufacturing the magnetic head for vertical magnetic recording of the invention, the step of forming the main pole layer may include the step of flattening the top surfaces of the gap layer and the first layer between the step of forming the first layer and the step of forming the second layer. In this case, a slight difference in level between the top surfaces of the gap layer and the first layer is eliminated so that the main pole layer is formed with accuracy.

According to the method of manufacturing the magnetic head for vertical magnetic recording of the invention, the step of forming the main pole layer may include the step of flattening the top surface of the second layer after the second layer is formed. In this case, in the medium facing surface, the end of the main pole layer opposite to the gap layer is flattened. It is thereby possible that the magnetic field generated from the main pole layer in the medium facing surface is made consistent with respect to the direction intersecting the tracks. As a result, distortion of the bit pattern shape of the recording medium is suppressed, and the linear recording density is improved.

Obviously many modifications and variations of the present invention are possible in the light of the above teachings. It is therefore to be understood that within the scope of the appended claims the invention may be practiced otherwise than as specifically described.

What is claimed is:

1. A magnetic head for vertical magnetic recording comprising:
a medium facing surface that faces toward a recording medium;
a coil for generating a magnetic field corresponding to data to be written on the recording medium;
a main pole layer for allowing a magnetic flux corresponding to the field generated by the coil to pass therethrough and generating a write magnetic field for writing the data on the recording medium through the use of a vertical magnetic recording system;
an auxiliary pole layer disposed with a specific space from the main pole layer along a direction of movement of the recording medium;
a gap layer made of a nonmagnetic material and provided between the main pole layer and the auxiliary pole layer; and
a yoke layer connected to the main pole layer and the auxiliary pole layer and magnetically coupling the main pole layer to the auxiliary pole layer, wherein:
the main pole layer incorporates:
a first portion disposed in a region closer to the medium facing surface than a first position located at a specific distance from the medium facing surface, the first portion having a uniform width from the medium facing surface to the first position; and
a second portion disposed in a region farther from the medium facing surface than the first position and having a width greater than the width of the first portion;
each of the first portion and the second portion has a first surface closer to the gap data-layer and a second farther from the gap layer, the second surface of the first portion being substantially flat;
the first portion further includes a region closer to the medium facing surface than a second position located between the first position and the medium facing surface, the region closer to the medium facing surface than the second position having a specific thickness, and includes a region farther from the medium facing surface than the second position, the region farther from the medium facing surface than the second position having a thickness greater than the specific thickness;
the yoke layer extends from a connection point between the yoke layer and the auxiliary pole layer toward the medium facing surface, touches the first surface of the second portion of the main pole layer, and has an end that is closer to the medium facing surface and located at a distance from the medium facing surface; and
the second position is located closer to the medium facing surface than the end of the yoke layer.

2. The magnetic head according to claim 1, wherein the main pole layer incorporates a first layer touching the gap layer and a second layer stacked on the first layer, the first layer has an end that is closer to the medium facing surface and located in the second position, and the second layer has an end face exposed from the medium facing surface.

3. The magnetic head according to claim 2, wherein the second layer has a saturated flux density greater than that of the first layer.

4. The magnetic head according to claim 1, wherein the first surface of the first portion includes a sloped surface that is located in a region farther from the medium facing surface than the second position and sloped such that a distance from the second surface increases as a distance from the medium facing surface increases.

5. The magnetic head according to claim 4, wherein the sloped surface and the second surface form an angle that is 25 degrees or greater and smaller than 90 degrees.

6. The magnetic head according to claim 1, wherein the main pole layer has a thickness taken in the medium facing surface that falls within a range of 0.05 μm to 0.3 μm inclusive.

7. The magnetic head according to claim 1, wherein the main pole layer has a surface exposed from the medium facing surface and having a shape of trapezoid wherein a side closer to the gap layer is smaller than the other side.

8. A head gimbal assembly comprising:
a slider including a magnetic head for vertical magnetic recording and disposed to face toward a recording medium; and
a suspension for flexibly supporting the slider, the magnetic head comprising:
a medium facing surface that faces toward the recording medium;
a coil for generating a magnetic field corresponding to data to be written on the recording medium;
a main pole layer for allowing a magnetic flux corresponding to the field generated by the coil to pass therethrough and generating a write magnetic field for writing the data on the recording medium through the use of a vertical magnetic recording system;
an auxiliary pole layer disposed with a specific space from the main pole layer along a direction of movement of the recording medium;
a gap layer made of a nonmagnetic material and provided between the main pole layer and the auxiliary pole layer; and
a yoke layer connected to the main pole layer and the auxiliary pole layer and magnetically coupling the main pole layer to the auxiliary pole layer, wherein:
the main pole layer incorporates:
a first portion disposed in a region closer to the medium facing surface than a first position located at a specific distance from the medium facing surface, the first portion having a uniform width from the medium facing surface to the first position; and
a second portion disposed in a region farther from the medium facing surface than the first position and having a width greater than the width of the first portion;
each of the first portion and the second portion has a first surface closer to the gap layer and a second surface farther from the gap layer, the second surface of the first portion being substantially flat;
the first portion further includes a region closer to the medium facing surface than a second position located between the first position and the medium facing surface, the region closer to the medium facing surface than the second position having a specific thickness, and includes a region farther from the medium facing surface than the second position, the region farther from the medium facing surface than the second position having a thickness greater than the specific thickness;
the yoke layer extends from a connection point between the yoke layer and the auxiliary pole layer toward the medium facing surface, touches the first surface of the second portion of the main pole layer, and has an end that is closer to the medium facing surface and located at a distance from the medium facing surface; and the second position is located closer to the medium facing surface than the end of the yoke layer.

9. A hard disk drive comprising:

a slider including a magnetic head for vertical magnetic recording and disposed to face toward a circular-plate-shaped recording medium that is rotated and driven; and an alignment device supporting the slider and aligning the slider with respect to the recording medium, the magnetic head comprising:

a medium facing surface that faces toward the recording medium;

a coil for generating a magnetic field corresponding to data to be written on the recording medium;

a main pole layer for allowing a magnetic flux corresponding to the field generated by the coil to pass therethrough and generating a write magnetic field for writing the data on the recording medium through the use of a vertical magnetic recording system;

an auxiliary pole layer disposed with a specific space from the main pole layer along a direction of movement of the recording medium;

a gap layer made of a nonmagnetic material and provided between the main pole layer and the auxiliary pole layer; and a yoke layer connected to the main pole layer and the auxiliary pole layer and magnetically coupling the main pole layer to the auxiliary pole layer, wherein:

the main pole layer incorporates:

a first portion disposed in a region closer to the medium facing surface than a first position located at a specific distance from the medium facing surface, the first portion having a uniform width from the medium facing surface to the first position; and a second portion disposed in a region farther from the medium facing surface than the first position and having a width greater than the width of the first portion;

each of the first portion and the second portion has a first surface closer to the gap layer and a second surface farther from the gap layer, the second surface of the first portion being substantially flat;

the first portion further includes a region closer to the medium facing surface than a second position located between the first position and the medium facing surface, the region closer to the medium facing surface than the second position having a specific thickness, and includes a region farther from the medium facing surface than the second position, the region farther from the medium facing surface than the second position having a thickness greater than the specific thickness;

the yoke layer extends from a connection point between the yoke layer and the auxiliary pole layer toward the medium facing surface, touches the first surface of the second portion of the main pole layer, and has an end that is closer to the medium facing surface and located at a distance from the medium facing surface; and the second position is located closer to the medium facing surface than the end of the yoke layer.

* * * * *